(12) United States Patent
Yoon et al.

(10) Patent No.: US 7,543,011 B2
(45) Date of Patent: Jun. 2, 2009

(54) MONTGOMERY MODULAR MULTIPLIER AND METHOD THEREOF USING CARRY SAVE ADDITION

(75) Inventors: Joong-Chul Yoon, Seoul (KR); Hee-Kwan Son, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 839 days.

(21) Appl. No.: 10/830,041

(22) Filed: Apr. 23, 2004

(65) Prior Publication Data
US 2004/0215686 A1 Oct. 28, 2004

Related U.S. Application Data

(63) Continuation-in-part of application No. 10/736,832, filed on Dec. 17, 2003.

(30) Foreign Application Priority Data

Apr. 25, 2003 (KR) ............... 2003-26482
Jan. 13, 2004 (KR) ............ 10-2004-0002393

(51) Int. Cl.
*G06F 7/38* (2006.01)
(52) U.S. Cl. .................... 708/491
(58) Field of Classification Search ........... 708/491, 708/656, 492, 461
See application file for complete search history.

(56) References Cited

U.S. PATENT DOCUMENTS 5,206,827 A * 4/1993 Tsuruta ............... 708/656

| 5,923,579 | A  | 7/1999  | Widigen et al. |
| 2002/0172355 | A1 | 11/2002 | Lu et al. |
| 2004/0054705 | A1 | 3/2004  | Le Quere |
| 2004/0252829 | A1 | 12/2004 | Son |

FOREIGN PATENT DOCUMENTS

| GB | 2 166 894 A1 | 5/1986 |
| WO | WO 02/073450 A1 | 9/2002 |

OTHER PUBLICATIONS

European Examination Report dated Feb. 28, 2007, for European Application No. 04252390.2-1243.
Wang, P. A. et al: "New VLSI Architectures Of RSA Public-Key Cryptosystem" Jun. 9, 1997 vol. 3, pp. 2040-2043.
Behrooz, Parhami: "High-Radix Multipliers" Computer Arithmetic: Algorithms And Hardware Design, 2000, p. 159, paragraph 10.2-161, figure 10.6.
Tenca, A. F. et al: "High-radix Design of A Scalable Modular Multiplier" crytographic Hardware and Embedded Systems, 3rd International Workshop, May 14, 2001 vol. 2162, pp. 185-201.

(Continued)

*Primary Examiner*—Chuong D Ngo
(74) *Attorney, Agent, or Firm*—Harness, Dickey & Pierce, P.L.C.

(57) ABSTRACT

A method of reducing power consumption and/or enhancing computation speed in the modulus multiplication operation of a Montgomery modulus multiplication module. A coding scheme reduces the need for an adder or memory element for obtaining multiple modulus values, and the use of carry save addition with carry propagation addition enhances the computational speed of the multiplication module.

15 Claims, 21 Drawing Sheets

OTHER PUBLICATIONS

Post, Katharina: European Search Report dated Sep. 15, 2006.
Chinese Office Action, along with the English language translation, dated Feb. 22, 2008, for Chinese Application No. 200410055212.6 (11 pp.).
European Search Report dated Jan. 15, 2008, for European Application No. 07015586.6-2212.
Morita, H., "A Fast Modular-multiplication Algorithm Based on a Radix 4 and Its Application", The Transactions of the IEICE, Jul. 1990, pp. 1081-1086, vol. E73, No. 7, Tokyo, JP.
Behrooz, Parhami, "High-Radix Multipliers", Computer Arithmetic: Algorithms and Hardware Design, 2000, pp. 157-171, Oxford University Press, New York, NY.

* cited by examiner

Fig. 3

| Inputs of Modulus Recoder(110) | | | Outputs of Modulus Recoder(110) | | Selected |
|---|---|---|---|---|---|
| SPP$_i$[1] | SPP$_i$[0] | M[1] | SEL_MM[1:0] | NEG_MM | MM$_i$[n+1:0] |
| 0 | 0 | 0 | 11 | 0 | 0 |
| 0 | 0 | 1 | 11 | 0 | 0 |
| 0 | 1 | 0 | 01 | 1 | M |
| 0 | 1 | 1 | 00 | 0 | M |
| 1 | 0 | 0 | 10 | 0 | 2M |
| 1 | 0 | 1 | 10 | 0 | 2M |
| 1 | 1 | 0 | 00 | 0 | M |
| 1 | 1 | 1 | 01 | 1 | M |

Fig. 5

| Inputs of Booth Recoder (140) | | | Outputs of Booth Recoder (140) | | | | Selected $PP_i[n+1:0]$ |
|---|---|---|---|---|---|---|---|
| $b_1$ | $b_0$ | $b_R$ | SEL_PP[1:0] | EN_PP | NEG_PP | | |
| 0 | 0 | 0 | Don't care | 0 | 0 | | 0 |
| 0 | 0 | 1 | 00 | 1 | 0 | | A |
| 0 | 1 | 0 | 00 | 1 | 0 | | A |
| 0 | 1 | 1 | 10 | 1 | 0 | | 2A |
| 1 | 0 | 0 | 11 | 1 | 1 | | $\underline{2A}$ |
| 1 | 0 | 1 | 01 | 1 | 1 | | $\underline{A}$ |
| 1 | 1 | 0 | 01 | 1 | 1 | | $\underline{A}$ |
| 1 | 1 | 1 | Don't care | 0 | 0 | | 0 |

Fig. 15

| Inputs of Booth Recoder(190) | | | Outputs of Booth Recoder(190) | | | | Selected $PP_i[n+1:0]$ |
|---|---|---|---|---|---|---|---|
| B[1] | B[0] | B[R] | SFT_PP | EN_PP | NEG_PP | | |
| 0 | 0 | 0 | 0 | 0 | 0 | | 0 |
| 0 | 0 | 1 | 0 | 1 | 0 | | A |
| 0 | 1 | 0 | 0 | 1 | 0 | | A |
| 0 | 1 | 1 | 1 | 1 | 0 | | 2A |
| 1 | 0 | 0 | 1 | 1 | 1 | | 2A |
| 1 | 0 | 1 | 0 | 1 | 1 | | A |
| 1 | 1 | 0 | 0 | 1 | 1 | | A |
| 1 | 1 | 1 | 0 | 0 | 0 | | 0 |

Fig. 18

| Inputs of Analysis Value Selector(530) | | Outputs of Analysis Value Selector(530) | | | Selected First Analysis Value PP_i[n+1:0] | Selected Second Analysis Value A_i[n+1:0] |
|---|---|---|---|---|---|---|
| B[0] | B[1] | SEL_A1[1:0] | SEL_A2 | SEL_A3 | | |
| 0 | 0 | Don't care | 0 | 0 | 0 | 0 |
| 0 | 1 | 01 | 1 | 0 | A | 0 |
| 1 | 0 | 00 | 1 | 0 | 2A | 0 |
| 1 | 1 | 00 | 1 | 1 | 2A | A |

Fig. 19

| Inputs of Modulus Selector(570) | | $q_i$ | Outputs of Modulus Selector(570) | | Selected First Analysis Value $MM_i[n+1:0]$ | Selected Second Analysis Value $M_i[n+1:0]$ |
|---|---|---|---|---|---|---|
| $SSPP_i[1:0]$ | $M[1]$ | | $SEL\_M1[1:0]$ | $SEL\_M2$ | | |
| 00 | 0 | 00 | 01 | 0 | 0 | 0 |
| 01 | 0 | 01 | 10 | 0 | M | 0 |
| 10 | 0 | 10 | 11 | 0 | 2M | 0 |
| 11 | 0 | 11 | 11 | 1 | 2M | M |
| 00 | 1 | 00 | 01 | 0 | 0 | 0 |
| 01 | 1 | 11 | 11 | 1 | 2M | M |
| 10 | 1 | 10 | 11 | 0 | 2M | 0 |
| 11 | 1 | 01 | 10 | 0 | M | 0 |

MONTGOMERY MODULAR MULTIPLIER AND METHOD THEREOF USING CARRY SAVE ADDITION

CROSS REFERENCE TO RELATED APPLICATIONS

This application claims priority under 35 U.S.C. § 119 from Korean Patent Application Nos. 2003-26482, filed on Apr. 25, 2003 and 2004-02393, filed on Jan. 13, 2004, in the Korean Intellectual Property Office, and under 35 U.S.C. § 120 as a continuation-in-part of U.S. patent application Ser. No. 10/736,832, filed Dec. 17, 2003, the disclosures of which are hereby incorporated by reference in their entirety.

FIELD OF THE INVENTION

The present invention relates to a cryptography system for data security and, more particularly, to a modular multiplier and method thereof.

BACKGROUND OF THE INVENTION

An elliptical curves cryptosystem (ECC) includes a GF(p) operation based on an integer modular multiplication and a $GF(2^m)$ operation based on a polynomial modular multiplication.

A Montgomery modular multiplication algorithm, which is an integer modular multiplication, may be expressed by Equation 1:

$$R = A*B*r^{-1} \bmod N, \text{ (where the radix } r=2^n) \tag{1}$$

where A, B, and N are the multiplicator, multiplicand, and modular number, respectively, and each has n bits ($n \geq 1$).

A conventional hardware implementation of a Montgomery modular multiplication algorithm is shown in FIG. 1, which utilizes a multiple modulus selector 1, a booth recoder 12, and an accumulator 2. The multiple modulus selector 1 selects a value for the multiple modulus (0, M, 2M, and 3M) and outputs the selected value to a carry propagation adder (CPA) 14. To obtain a value of 3M, an additional adder may be used, which may increase the hardware size and/or decrease computational speed.

The accumulator 2 may includes two CPAs 14 and 11, each potentially increasing a propagation delay time of an accumulator and/or decreasing computation speed. The CPA 11 receives a partial product value from a multiplicand selector 13 and a previous value P[i] of the output of the accumulator 2. The CPA 11 adds the partial product and P[i]. The output of the CPA 11 is input to the CPA 14 to obtain a resultant accumulation value for an i+1 iteration, P[i+1], obtaining a result for the Montgomery multiplication $P[i+1] = ABR^{-1} \bmod M$.

A polynomial modular multiplication may be expressed may be expressed by Equation 2:

$$P(x) = A(x)B(x) \bmod G(x) \tag{2}$$

where A(x) and B(x) are elements of $GF(2^m)$, and G(x) is a primitive polynomial whose degree is m.

A(x), B(x), and G(x) may be expressed may be expressed by Equation 3.

$$A(x) = a_{n-1}x^{n-1} + a_{n-2}x^{n-2} + \ldots + a_1 x + a_0$$

$$B(x) = b_{n-1}x^{n-1} + b_{n-2}x^{n-2} + \ldots + b_1 x + b_0$$

$$G(x) = g_{n-1}x^{n-1} + g_{n-2}x^{n-2} + \ldots + g_1 x + g_0 \tag{3}$$

Generally, a separate multiplier is provided for an integer modular multiplication and a polynomial modular multiplication.

SUMMARY OF THE INVENTION

Exemplary embodiments of the present invention provide for methods of accelerating the speed of Montgomery modular multiplication and/or reducing power consumption by using a coding scheme which may eliminate the need for an additional adder or memory when obtaining the multiple modulus value.

In exemplary embodiments of the present invention, a carry save adder (CSA) may be used instead of a CPA in an accumulator to improve computation speed and propagation delay.

In exemplary embodiments of the present invention, a coding scheme may eliminate the need for an adder or memory element for obtaining the multiple modulus value.

Exemplary embodiments of the present invention provide a multiplier for accelerating the speed of modular multiplication without increasing hardware size.

Exemplary embodiments of the present invention provide a multiplier for more efficiently realizing hardware and operation of Montgomery modular multiplication algorithm based on radix-N logic operation (for example radix-4).

In an exemplary embodiment of the present invention, a radix-4 interleaved Montgomery multiplication algorithm is provided which is based on radix-4 logic operation and employs a Montgomery multiplication algorithm (a "R4IMM").

Exemplary embodiments of the present invention provide a multiplier which can selectively perform an integer modular multiplication and a polynomial modular multiplication.

A logic operation scheme of a multiplier according to exemplary embodiments of the present invention may be applied to a computer system or communication network employing a public key cryptographic algorithm and may be realized in a portable integrated circuit card (or smart card).

Exemplary embodiments of the present invention may be applied to a modular multiplication based on larger integers, for example, integers of 122 bits or more.

Further areas of applicability of embodiments of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

Exemplary embodiments of present invention will become more fully understood from the detailed description and the accompanying drawings.

FIG. 3 illustrates a coding scheme of a modulus recoder according to an exemplary embodiment of the present invention.

FIG. 5 illustrates a coding scheme of a booth recoder according to an exemplary embodiment of the present invention.

FIG. 15 illustrates a coding scheme of a booth recoder illustrated in FIG. 14 according to an exemplary embodiment of the present invention.

FIG. 18 illustrates a coding scheme for obtaining $b_I A$ of an analysis value selector according to an exemplary embodiment of the present invention.

FIG. 19 illustrates a coding scheme of a modulus selector according to an exemplary embodiment of the present invention.

DETAILED DESCRIPTION OF EXEMPLARY EMBODIMENTS OF THE PRESENT INVENTION

The following description of exemplary embodiment(s) is merely illustrative in nature and is in no way intended to limit the invention, its application, or uses.

Figure 2:
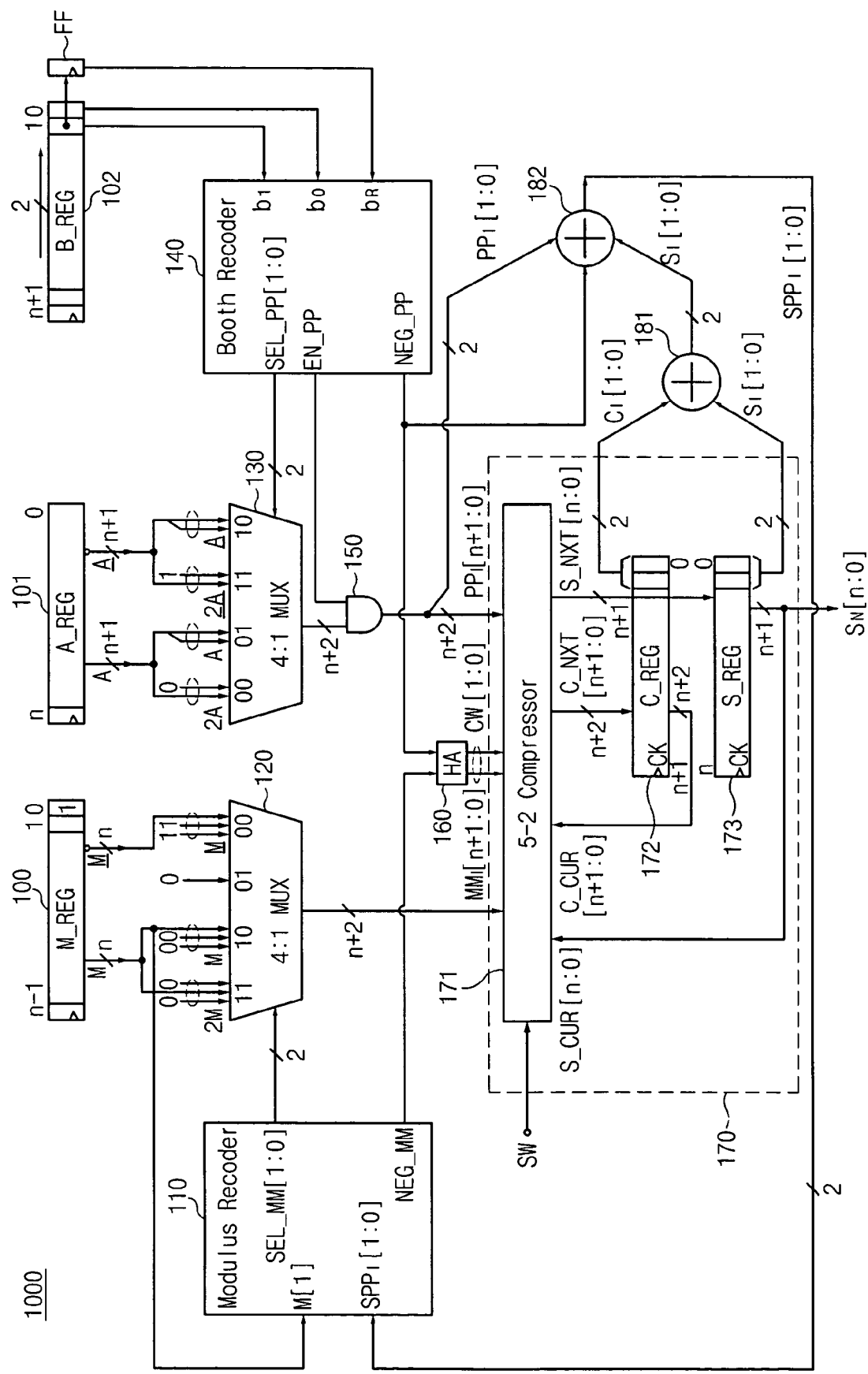
FIG. 2 illustrates a general configuration of a modular multiplier according to an exemplary embodiment of the present invention.

A modular multiplier according to exemplary embodiment of the present invention is illustrated in FIG. 2. Referring to FIG. 2, the multiplier 1000 may include a modulus (M) stored in a modulus register (M_REG) 100, a multiplicand (A) stored in a multiplicand register (A_REG) 101, a multiplicator (B) stored in a multiplicator register (B_REG) 102, a modulus recoder 110, a booth recoder 140, a multiplexer 120 for aiding in the computation of a multiple modulus $MM_I$, a multiplexer 130 for aiding in the computation of a partial product $PP_I$, and an accumulator 170 for aiding in the computation of modular multiplication. The accumulator 170 receives the partial product PPI, the multiple modulus MMI, and a compensation word signal CW to output a result of the Montgomery multiplier.

In exemplary embodiments of the invention, the modulus M is a positive integer and has n bits (M[n−1:0]), the multiplicand A is a negative or positive integer and has n+1 bits (A[n:0]), one bit for a sign bit, and the multiplicator B has an even number of bits. If n is even, B has n+2 bits, two bits being sign bits. If n is odd, B has n+1 bits, one bit being a sign bit. The multiplicator B may be shifted right by two bits in each clock cycle. The least significant two bits b1 and b0 of the multiplicator B and a bit $B_R$ (where $B_R$ is a bit b1 from a previous cycle) are provided to the booth recoder 140.

The modulus register (M_REG) 100 provides the modulus M and M̲, where M̲ is the one's complement of M. Similarly, the multiplicand register (A_REG) 101 provides the multiplicand A and A̲, where A̲ is the one's complement of A and multiplicator register (B_REG) 102 provides the multiplicator B.

In an exemplary embodiment, the multiplier 1000 performs modular multiplication in an iterative process. The modulus recoder 110 and the multiplexer 120 are used to select multiple modulus ($MM_I$) values. To select $MM_I$ values, the modulus recoder 110 receives iterative data from the accumulator 170. In an exemplary embodiment, the iterative data $SPP_I[1:0]$ is based on the two least significant bits (LSBs) of values in a sum ($S_I[1:0]$) and carry ($C_I[1:0]$) register of the accumulator 170, two LSBs of the partial product value ($PP_I[1:0]$), and a partial product negation indicating signal NEG_PP. The sum $S_I[1:0]$ and the carry $C_I[1:0]$ may be combined in a two-bit adder 181 to form a combined signal. The combined signal may be combined with $PP_I[1:0]$ and NEG_PP in a two-bit adder 182 to form $SPP_I[1:0]$. The modulus recoder 110 may further receive the least significant bit M[1] of the modulus M[1]. The Modulus recoder 110 may use $SPP_I[1:0]$ and M[1] to output a plurality of signals for determining the selection of a multiple modulus $MM_I$ value. The discussion above, with respect to exemplary embodiments of the present invention, is not intended to limit the bit size of values. For example, the $SPP_I$ may have more than two bits, and other elements of the exemplary embodiment may be similarly varied.

The modulus recoder 110 may output a plurality of multiple signals. In an exemplary embodiment, the modulus recoder 110 outputs a selection signal SEL_MM[1:0] to the multiplexer 130 so as to select one of 2M, M, 0, and M. The multiplexer 120 may receive the modulus M and the selection signal SEL_MM[1:0] to output $MM_I$. The $MM_I$ may be input to the accumulator 170. The multiple modulus negation indicating signal NEG_MM may be combined in a half adder 47 with the partial product negation indicating signal NEG_PP to obtain the compensatory word signal CW. The compensatory word signal CW may be input to the accumulator 250.

The modulus negation indicating signal NEG_MM may be used to indicate whether the selected value of $MM_I$ should be bit-inverted. Likewise, the modulus negation indicating signal NEG_PP may be used to indicate whether the selected partial product. $PP_I$ should be bit-inverted. An additional adder and/or a memory device results in increase of hardware size and/or computation delay, which has an influence on computation speed and/or power consumption. The coding scheme illustrated in FIG. 3 uses bit inversion and bit shifting to obtain the value of $MM_I$ without an additional adder or a memory device.

FIG. 3 illustrates a coding scheme in accordance with exemplary embodiments of the present invention. Although FIG. 3 shows three inputs to the Modulus recoder 110, M[1]

and $SPP_I[1:0]$, the present invention can have a variety of inputs and outputs depending upon the design criteria. Typical values of the multiple modulus $MM_I$ are (0, M, 2M, 3M). As described above the value 3M may require an additional adder or memory element to add 1M to 2M to obtain the value of 3M. An additional adder and/or memory element contributes to hardware size and/or computational delay, which affects computational speed and power usage. The coding scheme shown in FIG. 3 utilizes bit-inversion and bit-shift to obtain the value of $MM_I$ without an additional adder or memory element.

The Modulus recoder 110 may input M[1], the second least significant bit of the Modulus M, and, in an exemplary embodiment, $SPP_I[1:0]$, two LSBs of $SPP_I$. Modulus recoder 110 outputs a modulus selection signal SEL_MM[1:0]. SEL_MM[1:0] is used to select one of four possible multiple modulus numbers (0, $\underline{M}$, M, 2M). The signal NEG_MM indicates whether a bit-inversion is used, obtaining $\underline{M}$. The resultant selected multiple modulus value $MM_I$ is sent to the accumulator 250. The discussion above, with respect to exemplary embodiments of the present invention, is not intended to limit the bit size of values. $SPP_I$ can have more than two bits as can other elements of the embodiment.

The modulus recoder 110 may receive the second LSB M[1] of the modulus M and LBS two bits of the $SPP_I$. The modulus recoder 110 may output the modulus selection signal SEL_MM[1:0]. The selected modulus value MMI may be transferred to the accumulator 170. The discussion above, with respect to exemplary embodiments of the present invention, is not intended to limit the bit size of values. For example, the SPP1 may have two bits or more, and other elements of the exemplary embodiment may be similarly varied.

Figure 4:
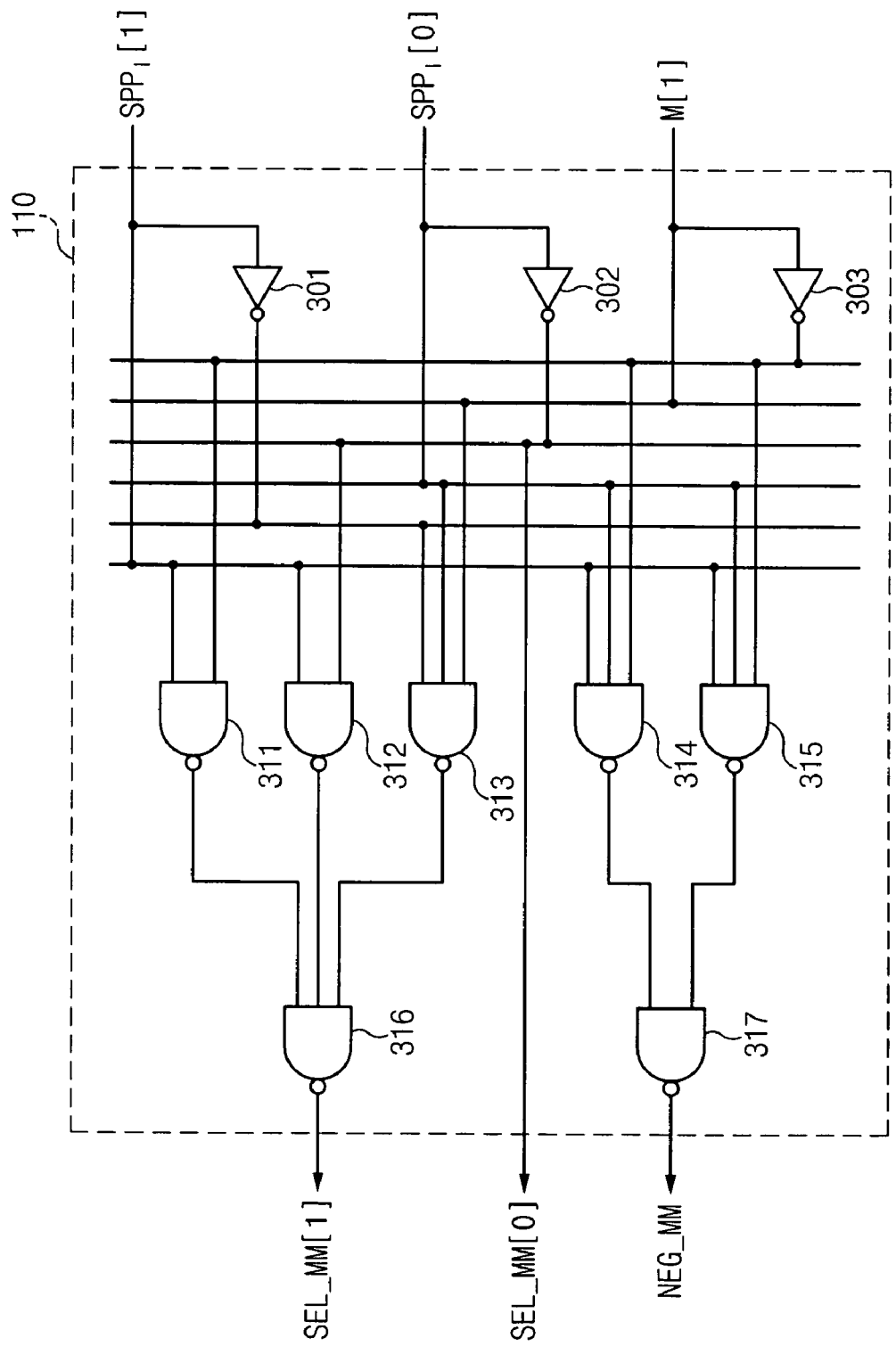
FIG. 4 illustrates an implementation of a modulus recoder according to an exemplary embodiment of the present invention.

FIG. 4 illustrates an exemplary implementation of the modulus recoder 110 according to an exemplary embodiment of the present invention. Although the exemplary implementation of the modulus recoder 110 includes inverters 301-303 and NAND gates 311-317, many other implementations of the modulus recoder 110 could be realized by one of ordinary skill in the art.

Figure 6:
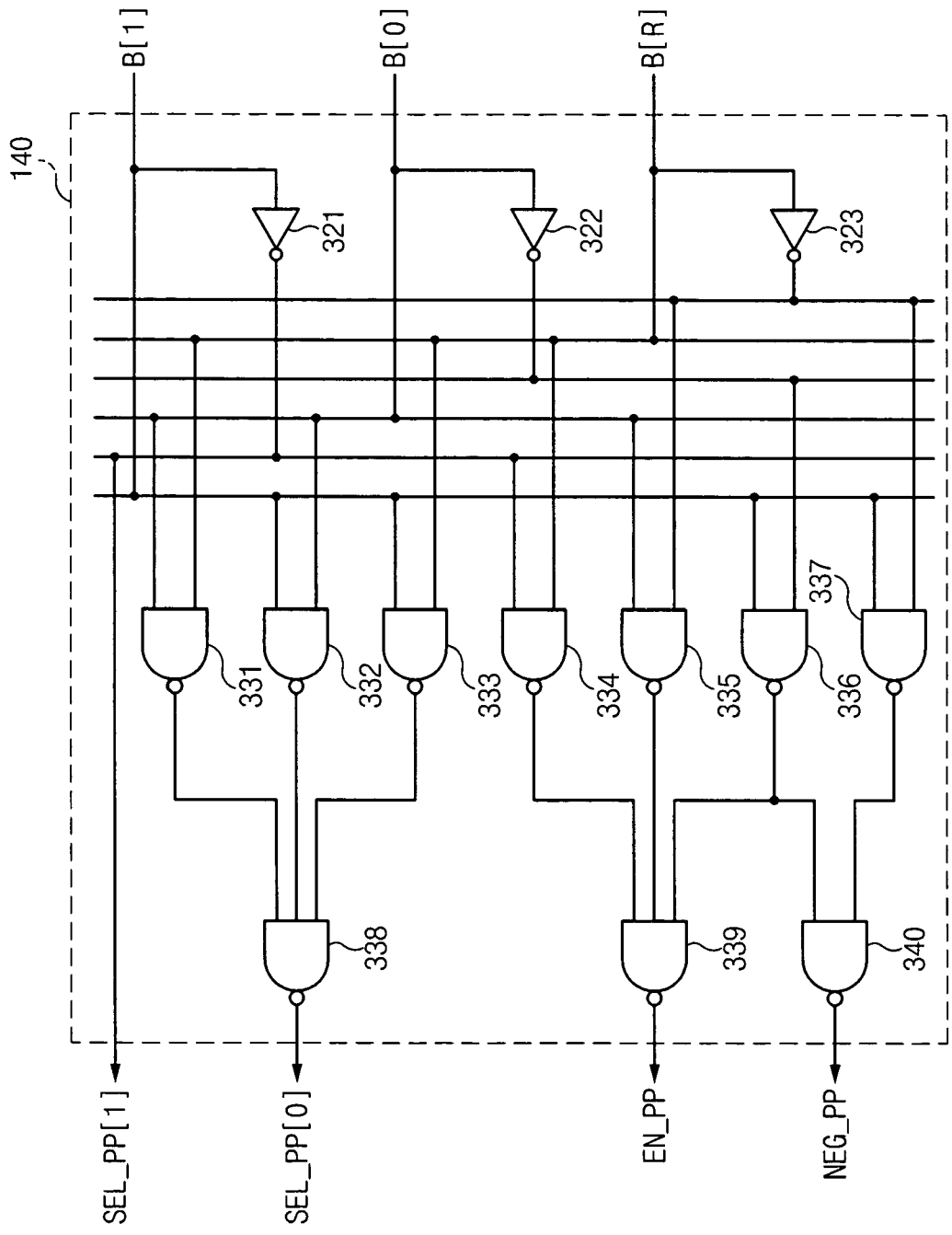
FIG. 6 illustrates an implementation of the booth recoder according to an exemplary embodiment of the present invention.

A similar technique for reducing hardware size, increasing computation speed, and/or reducing power consumption may be applied to the booth recoder 140 illustrated in FIG. 2, FIG. 5, and FIG. 6. The multiplier 1000 may input the modulus $MM_I$ and the partial product $PP_I$ to the accumulator 170 to perform a modular multiplication via an iterative process.

The booth recoder 140 and the multiplexer 130 may be used to select 0, A, 2A, $\underline{A}$, and $\underline{2A}$ that are values of a partial product $PP_I$ to be provided to the accumulator 170. FIG. 5 illustrates a coding scheme of a booth recoder 140 according to an exemplary embodiment of the present invention. The booth recoder 140 may receive the two LSBs of multiplicators B[1] and B[0] and a previous value B[R] of an iterative value B[1] to output a partial product selection signal SEL_PP[1:0], a partial product enable signal EN_PP, and a partial product negation indicating signal NEG_PP. Although three inputs B[1], B[0], and B[R] input to the booth recoder 140 are illustrated in FIG. 5, the present invention can have a variety of inputs and outputs depending upon the design criteria.

To select $PP_I$ values, the Booth recoder 140 outputs the partial product selection signal SEL_PP[1:0] to the multiplexer 130 for selecting one of four values $\underline{2A}$, $\underline{A}$, A, and 2A. FIG. 6 illustrates an exemplary implementation of the booth recoder 140. Although the exemplary implementation of the booth recoder 140 of FIG. 6 includes inverters 321-323 and NAND gates 331-340, many other implementations of the booth recoder 140 could be realized by one of ordinary skill in the art.

Returning to FIG. 2, the multiplexer 130 may receive a value of the multiplicand A and the signal SEL_PP[1:0] to provide an output to an AND gate 150. The AND gate 150 may receive an input from the multiplexer 130 and a partial product enable signal EN_PP from the booth recoder 140. The AND gate 150 may output the selected value of the partial product $PP_I$ to the accumulator 170. When the signal EN_PP has a zero value, the AND gate 150 outputs a zero value for $PP_I$ to the accumulator 170. The partial product negation signal NEG_PP may also be input to a half adder 160. A value of 1 for NEG_PP may indicate that a bit-inversion should be performed for the partial product $PP_I$ to obtain one of the values $\underline{2A}$ or $\underline{A}$ for a new $PP_I$ value input to the accumulator 170.

Figure 1:
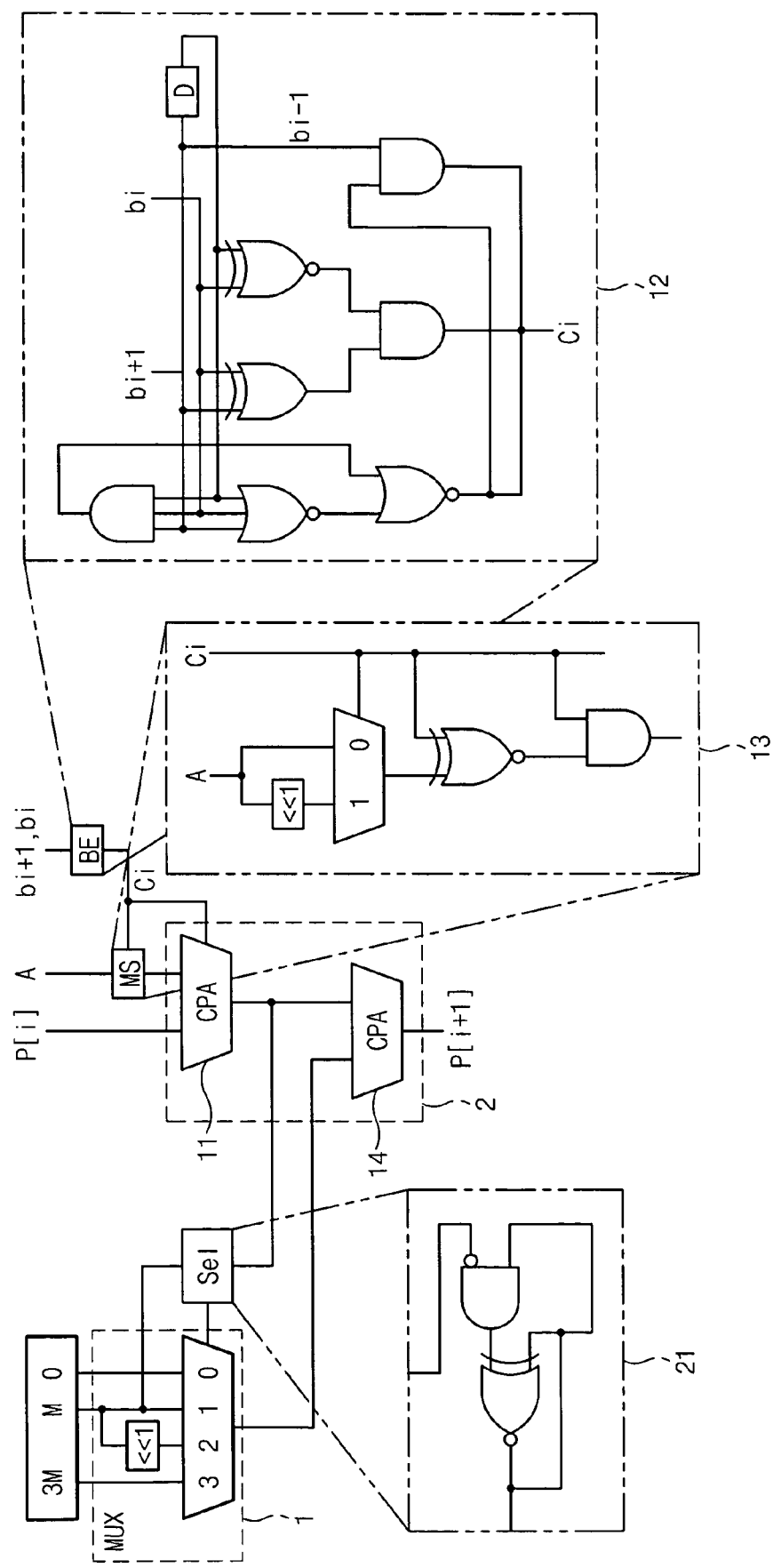
FIG. 1 illustrates a hardware configuration of a conventional Montgomery modular multiplication algorithm using a modulus selector, a booth recoder, and an accumulator.

In addition to $PP_I$ and $MM_I$ values, the compensation word signal CW may also be input to the accumulator 170 from the half adder 160. The accumulator 170 may input the partial product $PP_I$, the modulus $MM_I$, and the compensation word signal CW to a compressor 171 for use in a carry save adder (CSA) and a carry propagation adder (CPA). The adder shown in FIG. 1 uses a CPA, which results in a lower operation speed. A CSA may be used to reduce propagation delay, reduce power consumption, enhance computation speed, and/or enhance operation speed.

Figure 7:
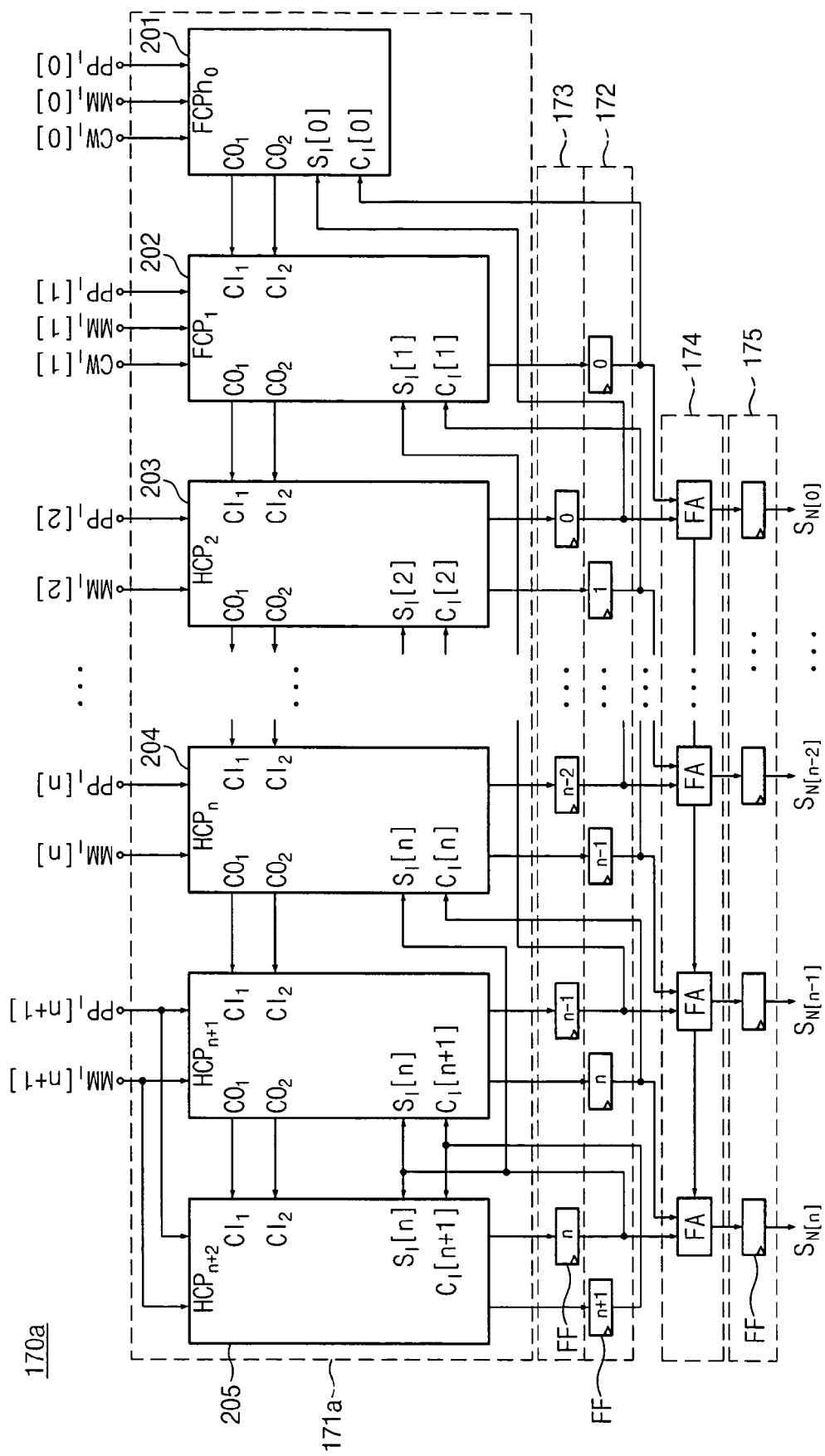
FIG. 7 illustrates an exemplary embodiment of the present invention using carry save addition (CSA) and a carry propagate addition (CPA) in combination.
Figure 11:
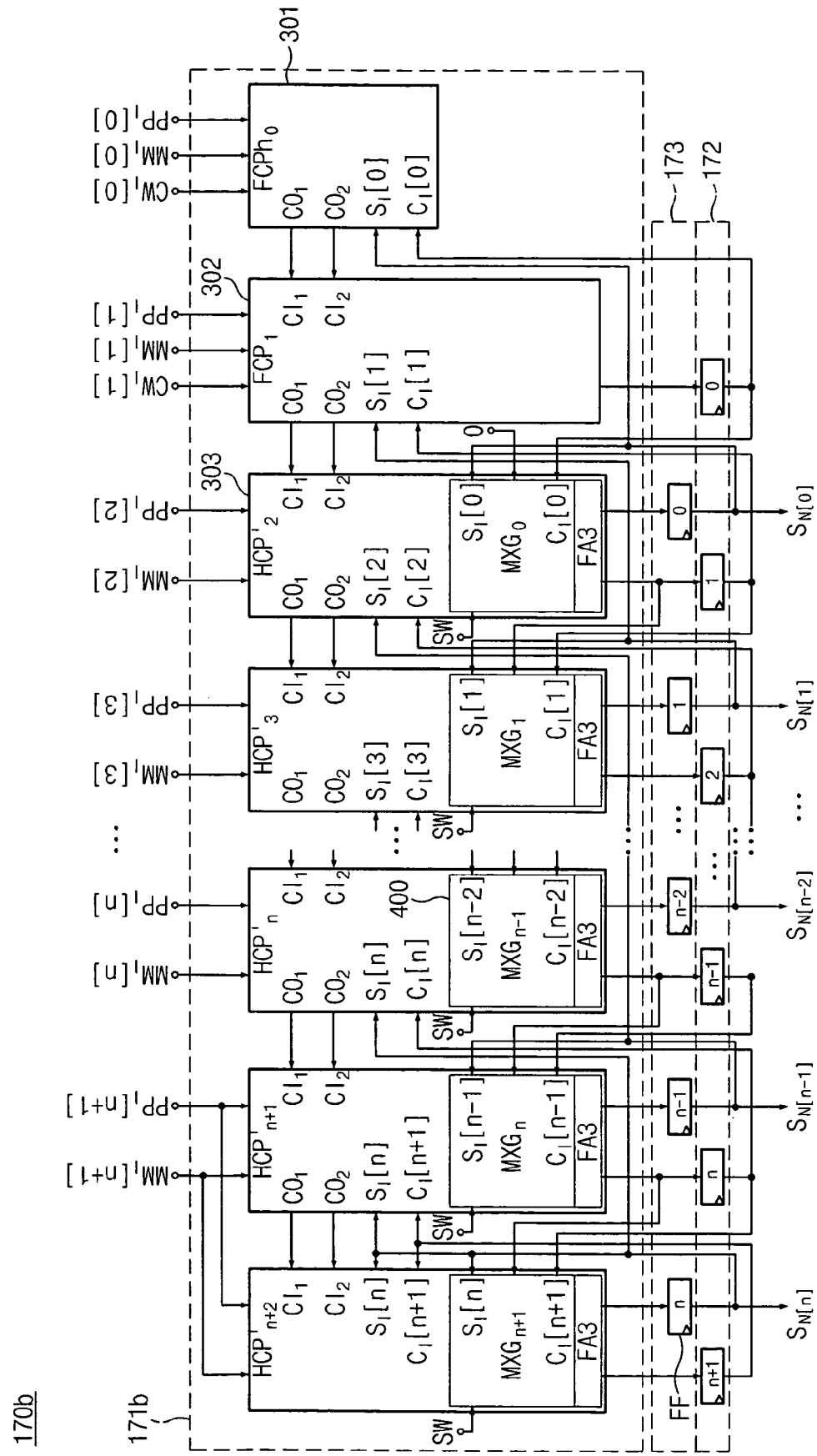
FIG. 11 illustrates an exemplary embodiment of the present invention using carry save addition (CSA) and a carry propagate addition (CPA) in combination.

Exemplary embodiments of the present invention may use a combination of CSA and CPA to enhance computation speed and/or reduce power consumption. In an exemplary embodiment of the present invention, a CPA (for example, one CPA, but more could also be used) is used during the final iteration, while the previous iterations use a CSA (for example, one CPA, but more could also be used). FIG. 7 and FIG. 11 illustrate two exemplary embodiments using CSA and CPA in combination.

An exemplary accumulator 170a according to the invention is illustrated in FIG. 7. The, accumulator 170a may include n+2 series of 5-2 compressors. The 5-2 compressors may be classified into full compressors (e.g., 201-202) and reduced compressors (e.g., 203-205), where n is the bit length of a modulus value M. The accumulator 170a may store sum (S) and carry (C) values in a sum register (S_REG) 173 and a carry register (C_REG) 172, respectively. The outputs of the registers S_REG 173 and the C_REG 172 may be input to a carry propagation adder 174 that may convert a redundant number to a normal number and stores the converted number in a final register 175.

The inputs to the accumulator 170a, in an exemplary embodiment of the present invention, are the compensation word CW[1:0], the multiple modulus value $MM_I$ and the partial product value $PP_I$. The first two full compressors 201 and 202 may receive the compensation word CW[1:0] together with the modulus $MM_I[1:0]$ and the partial product $PP_I[1:0]$. The other reduced compressors 203-204, etc. may use the other bits of a multiple modulus value MMI[n+1:2] and a partial product value $PP_I$[n+1:2]. The last compressor 205 ((n+2)th compressor) may prevent overflow. In an exemplary embodiment, the first compressor 201 is a full compressor minus a third full adder.

Figure 8:
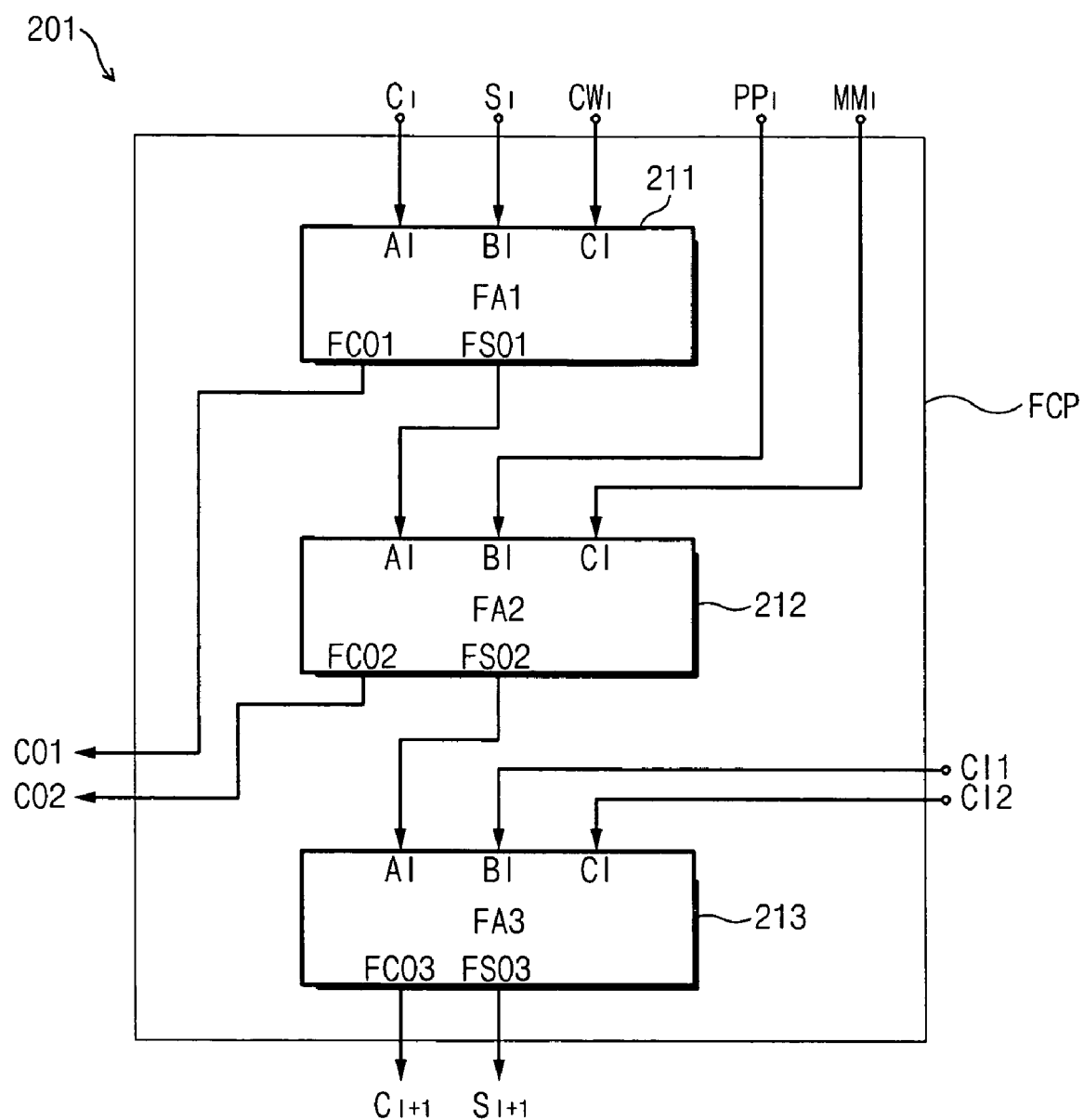
FIG. 8 illustrates an exemplary embodiment of a full compressor.
Figure 9:
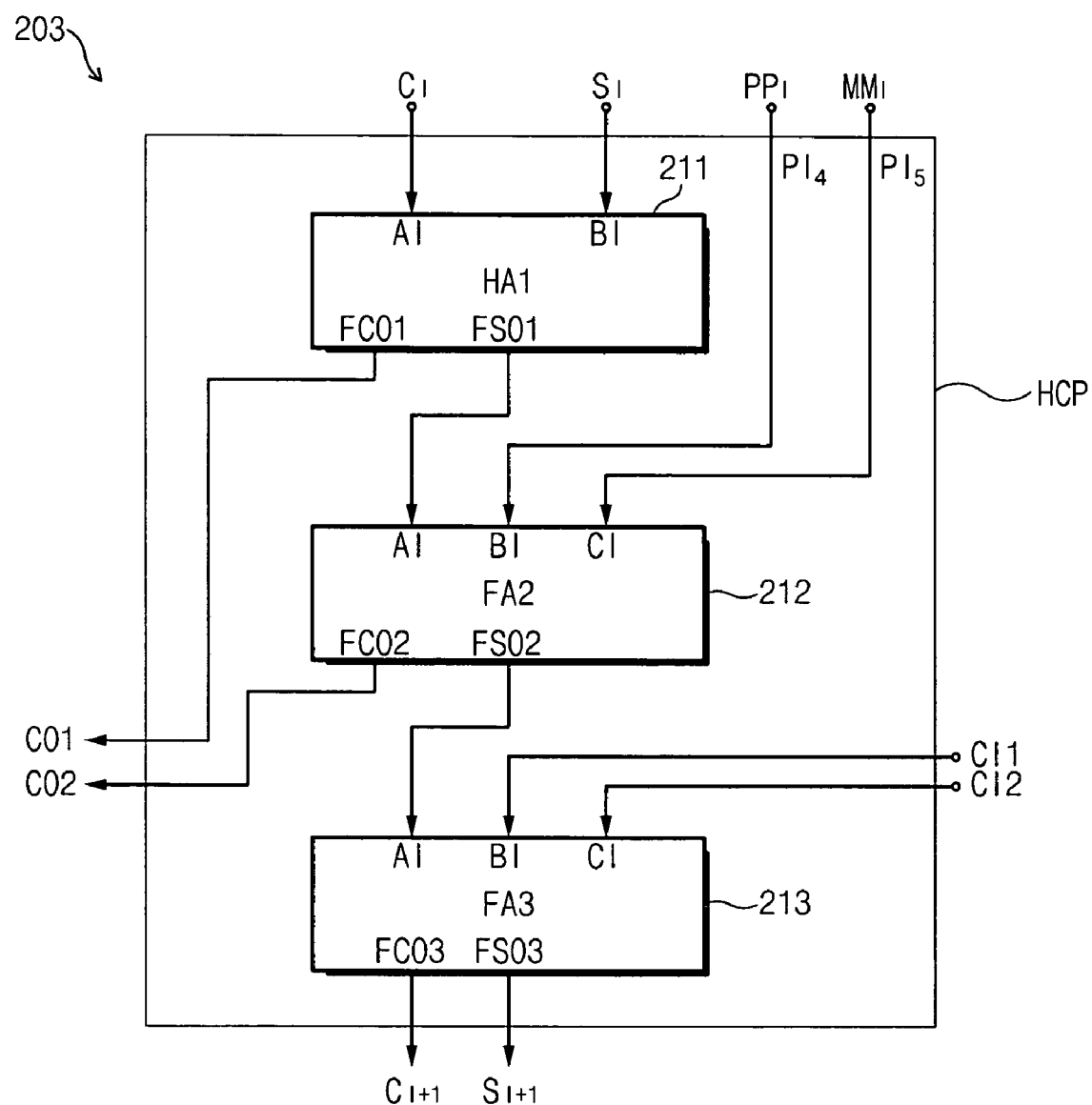
FIG. 9 illustrates an exemplary embodiment of a reduced compressor.

Exemplary configurations of the full compressor 201 and the reduced compressor 202 are illustrated in FIG. 8 and FIG. 9, respectively. Each compressor is used to obtain the next value (I+1) using a current value (I) and other inputs. FIG. 8 illustrates a full compressor 201 according to an exemplary embodiment of the present invention.

The full compressor 201 may have a plurality of inputs. In an exemplary embodiment, a full compressor 201 has five inputs, a current carry word bit value ($C_I$) obtained from a next carry word bit value from a compressor one bit higher, a current sum word bit value ($S_I$) obtained from a next sum word bit value from a compressor two bits higher, a compensation word value (CW), a partial product value ($PP_I$), and a multiple modulus value ($MM_I$). Inputted current carry word bit value may have an index of "I" in the current compressor and the other higher bit compressor outputs the next carry word bit value $C_{I+1}[k+1]$, where k represents the current "kth". The next carry word bit value $C_{I+1}[k+1]$ may be input to the carry register 172, and the carry register 172 may output the current carry word bit value $C_I$ to the kth compressor. The current sum word bit value $S_I[k]$ may be obtained by inputting the next sum word bit values $S_{I+1}[k+2]$ from the k+2 compressor to the sum register 173. The values may be used by the full compressor 201 to obtain a next carry word bit and next sum word bit values for the particular bit k, $C_{I+1}[k]$ and $S_{I+1}[k]$, respectively. These values pass through their respective carry and sum registers 172 and 173.

As previously stated, the carry and sum registers 172 and 173 may provide inputs to lower bit compressors, respectively. The next carry word bit ($C_{I+1}[k]$) and next sum word bit ($S_{+1}[k]$) values may be related by Equation 4:

$$(2C_{I+1}[k]+2CO1[k]+2CO2[k]+S_{I+1}[k])=(C_I[k]+S_I[k])+PP_I[k]+MM_I[k]+CW[k]+CI1[k]+CI2[k] \quad (4)$$

where if k>1, CW[k] is not an input.

In an exemplary embodiment, the full compressor 201 includes three full adders. A first full adder 211 receives the values $C_I$, $S_I$, and CW and outputs a first full adder carry (FCO1) and a first full adder sum (FSO1). A second full adder 20 outputs a carry FSO1 and a second full adder sum FSO2. The second full adder carry FOC2 acts as a first output carry CO2 to be an input CI2[k+1] for the next higher bit compressor (k+1). A third full adder 630 receives the second full adder sum FSO2 and CI1[k−1] and CI2[k−1] from a lower bit compressor (k−1) to output a third full adder carry FCO3 and a third full adder sum FSO3. The third full adder carry FCO3 acts as the next carry word bit value $C_{I+1}$ to be used as a carry $C_I$ that is input to a lower bit compressor (k−1). The third full adder sum FSO3 acts as the next sum word $S_{I+1}$ to be used as an input S1 that is input to a lower compressor (k−2). The first full compressor 201 corresponding to bit 0 does not output the next carry or sum words, so that the first full compressor 201 does not need the first full adder. Similarly, the second full compressor 202 corresponding to bit 1 does not output the next sum word bit.

Figure 10:
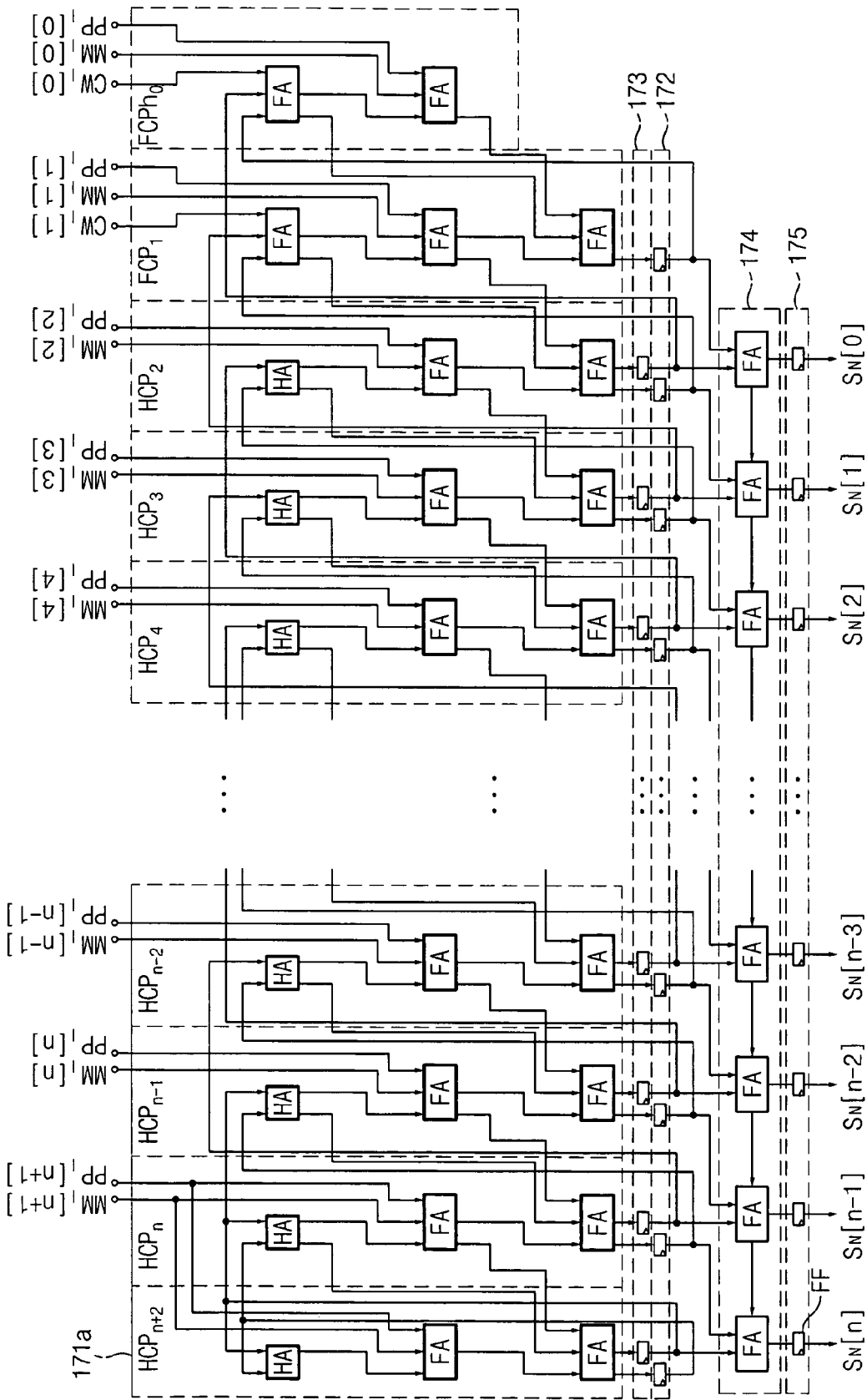
FIG. 10 illustrates an accumulator including reduced compressors illustrated in FIG. 9 according to an exemplary embodiment of the present invention.

The compensation word CW[1:0] may have two bits and may require two compressors for each bit. The two compressors 201 and 202 may be full compressors receiving a plurality of values. In exemplary embodiments, the compressors 201 and 202 receive five values. The higher bit compressors [2:n+2] may be reduced compressors receiving values that are less than those of the compressors 201 and 202. Reduced compressors illustrated in FIG. 9 replace the first full adder with a half adder. Thus, the half adder 211 in the reduced compressor receives the values $C_I$ and $S_I$ and outputs a first half adder carry (HCO1) and a first half adder sum (HSO1). The first half adder carry HCO1 acts as a first output carry CO1 to be provided to the secondary first input CI1[k+1] of the next-higher bit compressor (k+1). The second full adder 212 receives the first half adder sum HSO1, the partial product bit value $PP_I[k]$, and the multiple modulus bit value $MM_I[k]$ associated with the bit of the compressor. The second full adder 212 outputs a second full adder carry (FCO2) and a second full adder sum (FSO2). The second full adder carry FCO2 acts as a second output carry CO2 and a second input CI2[k+1] of the next higher bit compressor (k+1). The third full adder 213 outputs a third full adder carry (FSO3) and a third full adder sum (FSO3). The third full adder carry FCO3 acts as the next carry word bit $C_{I+1}$ and acts as input $C_I$ of a lower bit compressor (k−1) after passing the carry register 540. The third full adder sum FSO3 acts as the next sum word bit $S_{I+1}$ and acts as input $S_I$ of a lower compressor (k−2) after passing the sum register 173. FIG. 10 illustrates an accumulator 171a including the reduced compressors illustrated in FIG. 9.

The accumulator 171a may be a serial link of full compressors and reduced compressors. The number of the full compressors may depend on the input bit size of the multiple modulus value ($MM_I$) and the partial product value ($PP_I$). The two LSB compressors may be full compressors that use the compensation word (CW) as an input. The first bit compressor 201 may output carries CO1[0] and CO2[0] that become secondary inputs CI1[1] and CI2[1] of the next higher bit (second bit) compressor, respectively. This may continue until the highest bit compressor (n+2), which does not output carry outputs (CO1[n+2] and CO2[n+2]). The highest bit compressor may be used to prevent overflow and its secondary inputs may be obtained from its own next carry word bit and next sum word bit values.

Each compressor's next carry word bit value and next sum word bit values may be stored in the carry and sum registers 172 and 173, respectively. The final results may be generated in a separated form (redundant number) one part stored in the sum register 172 and the other part stored in the carry register 173. To obtain the final single word result $S_N[n:0]$, the value stored in the sum register 172 and the value stored in the carry register 173 may be added in a carry propagation adder 174, and the final single word result $S_N[n:0]$ is stored in a final register 175. Unlike a conventional system using a CPA mode, the system according to exemplary embodiments of the present invention use a CSA mode, as illustrated in FIG. 7. The CSA compressors may have three delay paths each being associated with each adder. In contrast, in a conventional accumulator, a delay path exists for each bit.

Therefore in the exemplary embodiment illustrated in FIG. 7, three delay paths exist for all compressors irrespective of the bit size n. In a conventional system, there would be "n" delay paths. Thus, the exemplary configuration may enhance the computational speed of a modular multiplication. For example, a 1024 bit multiplier a conventional system has an accumulator with 1024 delay (full adder paths), while exemplary embodiments of the present invention would have only the path delays associated with a single full compressor or reduced compressor, e.g., 3. Thus in this example, a multiplier according to exemplary embodiments of the present invention may be 300 times faster than the conventional system.

Exemplary embodiments of the present invention provide a multiplier for more efficiently realizing hardware and operation of Montgomery modular multiplication algorithm based on radix-N logic operation (for example radix-4).

In an exemplary embodiment of the present invention, a radix-4 interleaved Montgomery multiplication algorithm is provided which is based on radix-4 logic operation and employs a Montgomery multiplication algorithm (a "R4IMM").

Exemplary parameters for an R4IMM may be defined as follows:

M is a modulus and a positive integer greater than 2, and having an odd value (e.g., 3, 5, etc.);

M' is an integer meeting a conditional expression (−M*M') mod 4=1;

n is a value indicating the bit length of M and a positive integer (for example, 8);

N is a value indicating the digit length of M and a positive integer, wherein n is double of N (n=2N) and if n is 8, N is 4;

R is a positive integer where $R=2^n=2^{2N}$, wherein if n is 8, R is 256;

$R^{-1}$ is a modular inverse multiplier of R and a positive integer where $(R*R^{-1})$ mod M=1;

A is a multiplicand and an integer where $0 \leq A \leq M$; and

B is a multiplier and an integer where $0 \leq B \leq M$, wherein $$B = \mathop{Q}_{I=0}^{N-1} b_I A^I,$$

$b_I \in \{0, 1, 2, 3\}$ and $b_I$ is 2 bits.

A R4IMM algorithm may be defined as:

$S_0 := 0$ for I:=0 to (N−1).

$q_I := ((S_I + b_I A) \text{ mod } 4) * M') \text{ mod } 4$ $S_{I+1} := (S_I + b_I A + q_I M)/4$ end for if $(S_N \geq M)$ $S_N := S_N − M$ In an R4IMM algorithm, I may denote a digit index or the number of repeated operations, and the result of total multiplication subjected to an algorithm may be denoted as $S_N = A * B * R^{-1}$ (mod M). The range of the total multiplication $S_N$ may be $0 \leq S_N \leq M$. A quotient q, may denote the number of M to be added such that the two LSBs of '$S_I + b_I A + q_I M$' become "00". In a residue number system (RNS), a number obtained by adding any number to an integer times a modulus M is equal to the original number. Therefore, a number adding a multiple of modulus $q_I M$ (hereinafter referred to as $MM_I$), which is an integer times the modulus M, is equal to the original number. If the two LSBs of '$S_I + b_I A + q_I M$' becomes "00" and then divided by a radix value 4 (i.e., shifted right by two bits), a significant digit number is preserved as is, therefore, no information is lost.

To realize an R4IMM algorithm in hardware, the partial product value $PP_I$ and the multiple of modulus $MM_I$ may be obtained. Since a unit multiplier $b_I$ and the modulus $q_I$ may have two bits, the $PP_I$ and $MM_I$ may be set to have four possible values of the following four cases (wherein $b_I \in \{0, 1, 2, 3\}$ and $q_I \in \{0, 1, 2, 3\}$) as shown in Equation 5:

$b_I A = PP_I \in \{0, A, 2A, 3A\}$ $q_I M = MM_I \in \{0, M, 2M, 3M\}$ (5)

However, if the $PP_I$ and $MM_I$ are set as shown in Equation (5), it may be necessary to obtain a 1-bit shift value of A or M and an original value when values 3A and 3M are computed. Therefore, an independent adder for computing the values may be used or after the values are computed in advance and stored in a memory, they can be retrieved when needed. However, this is unnecessary hardware. Further, since this hardware may only be used to obtain the values 3A and 3M, processing speed may also be degraded.

Exemplary embodiments of the present invention may reduce the hardware needed to obtain the partial product value $PP_I$ and the multiple of modulus $MM_I$.

Other exemplary embodiments of the present invention include a variety of combinations of switching between CSA and CPA modes in the accumulator. FIG. 11 illustrates an accumulator 170b according to another exemplary embodiment of the invention, where multiplexers $MXG_{n+1}$-$MXG_0$ are used in combination with compressors to switch between CPA and CSA mode whenever desired. In such a configuration, the carry propagation adder 174 does not convert a redundant number to a normal number. The accumulator 170b of FIG. 10 may selectively operate in the CSA or CPA mode and thus the output may already be in normal number format. The CPA 174 may be removed to reduce the amount of hardware needed.

The multiplexers $MXG_{n+1}$-$MXG_0$ may control the electrical connections between full adders in the compressors. The first two bit compressors 301 and 302 need not pass the next carry word bit value $C_{I+1}[k]$ to obtain a current carry word-bit value $C_I[k-1]$ used by the lower bit compressor 301. Except for this, the first two bit compressors 301 and 302 may operate similar to the compressors 201 and 202, respectively, illustrated in FIG. 11. The next carry word bit value $C_{I+1}[k]$ may pass the next higher bit compressor [k+1] to be input to a multiplexer group of a higher bit compressor.

Figure 12:
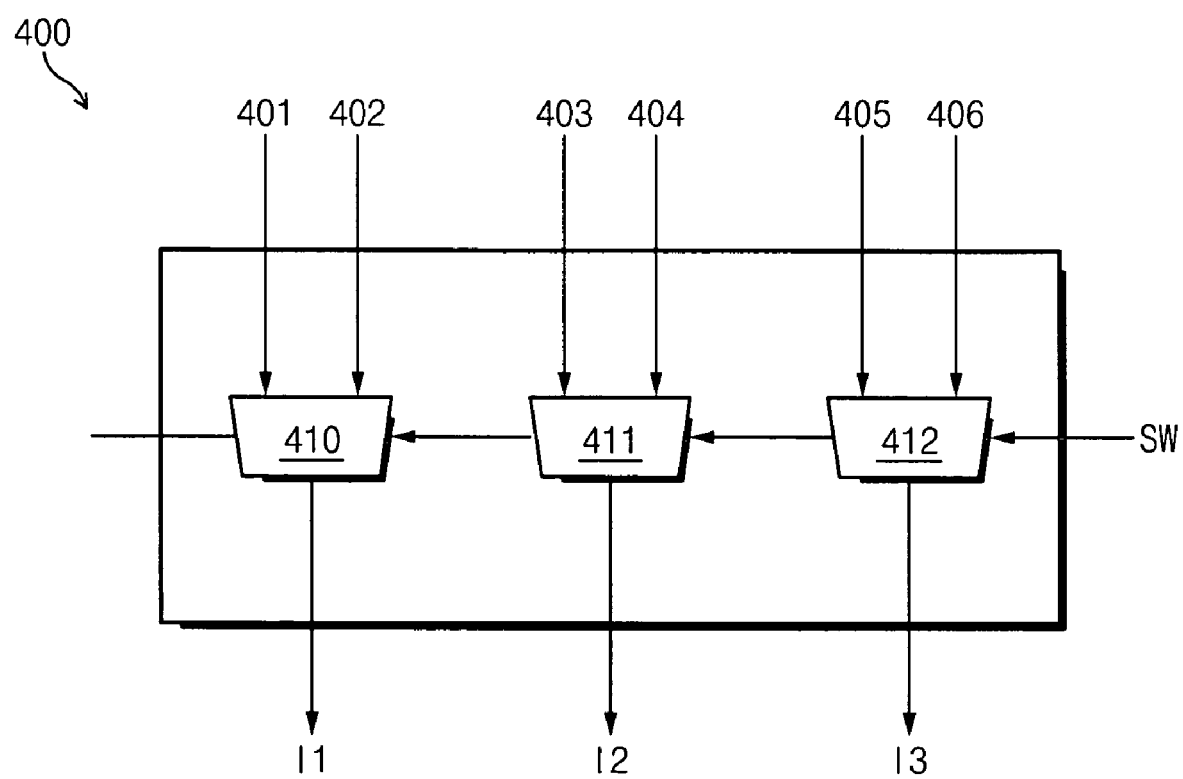
FIG. 12 illustrates a kth bit multiplexer group according to an exemplary embodiment of the present invention.
Figure 13:
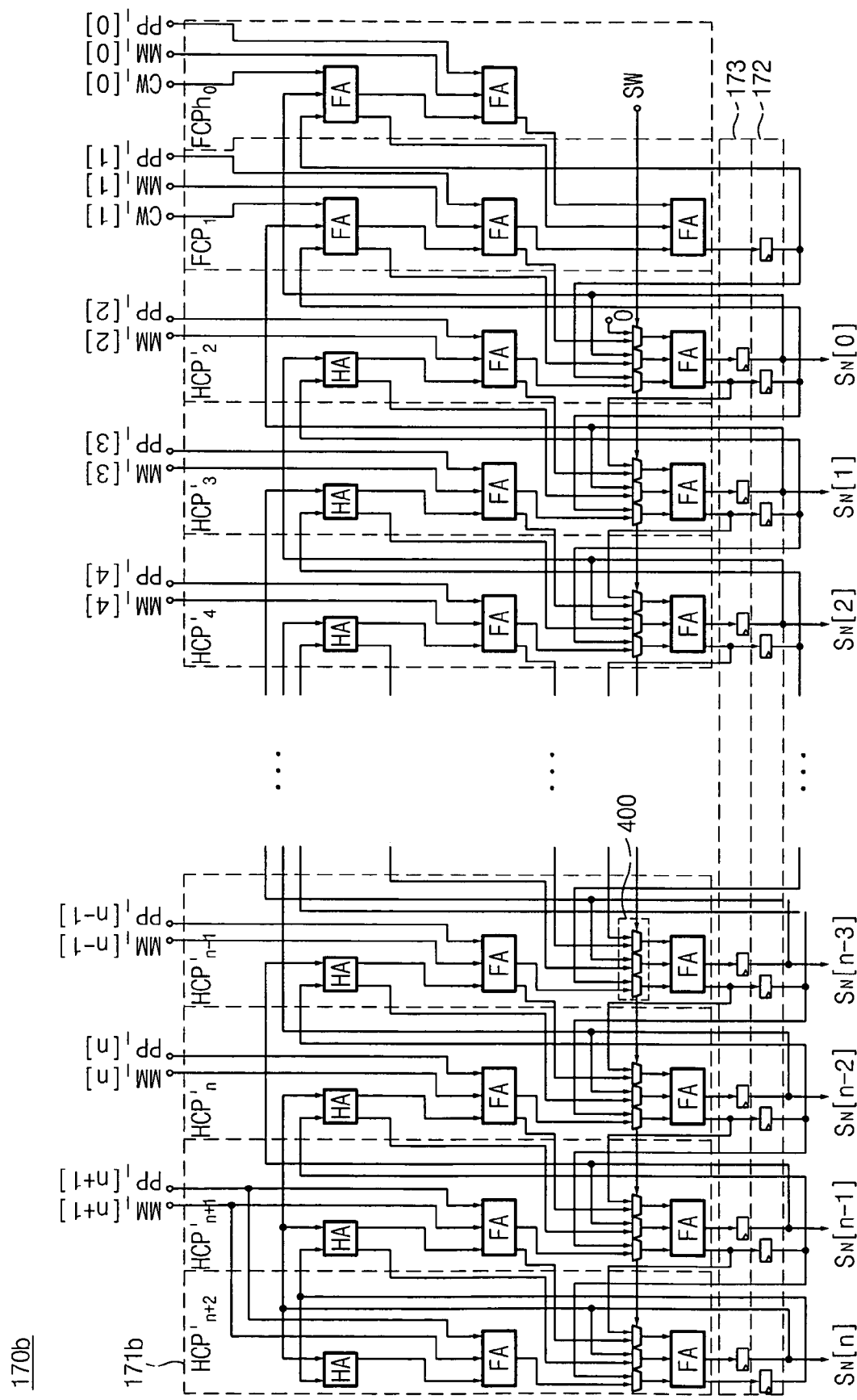
FIG. 13 illustrates a more detailed circuit diagram in which the multiplexer group illustrated in FIG. 11 is included in the accumulator illustrated in FIG. 10 according to an exemplary embodiment of the present invention.

FIG. 12 illustrates a kth bit multiplexer group 400 according to according to exemplary embodiments of the present invention and FIG. 13 illustrates a more detailed circuit diagram of the multiplexer group 400, illustrated in FIG. 11, included in the accumulator 170b illustrated in FIG. 10.

The computation mode (using CSA or using CPA) may be controlled by a switching signal SW. In an exemplary embodiment of the present invention, the kth bit multiplexer 400 is disposed between the second adder 212 and the third adder 213 of the reduced compressor 700 of FIG. 9. Thus, the first input 401 inputted to the multiplexer 410 may be FSO2 from adder 212. The second input 402 of the first multiplexer 410 may be the current carry word bit value $(C_I[k-1])$ from the (k−1)th bit compressor. The current carry word bit value may be obtained from the next carry word bit value $C_{I+1}[k-1]$ for the (k−1)th bit compressor. The second multiplexer 411 may receive two values. Of the two values, one 403 may be the first output carry value CO1[k−1] from the (k−1)th bit compressor, and the second 404 may be the current sum word bit value $S_I[k]$ from the kth bit compressor. The current sum word bit value may be obtained by allowing the next sum word bit value $S_{I+1}[k]$ to pass the sum register 173. Two inputs 405 and 406 of the third multiplexer 412 may be a second output carry value CO2[k−1] from the (k−1)th bit compressor and the next carry word bit value $\epsilon_{I+1}[k-1]$ from the (k−1)th bit compressor.

The switching signal SW may determine what input is transferred to the third full adder 213, among two inputs of the respective multiplexers 410, 411, and 412. Depending on what input is transferred thereto, a carry save addition or a carry propagation addition may be selected. If the value of the switching signal SW is zero ("0"), the switching compressors may operate in carry save addition mode. If the value is one ("1"), the bottom full adders of the compressors may be serially connected and may operate in carry propagation addition mode. The full adder 213 may output a next carry word bit value and a next sum word bit value, as described above.

Carry and sum words may be computed during N iterations, where N is (n+2)/2 if n is even or (n+1)/2 if n is odd. Carry and sum values outputted in a current iteration cycle may be added with those of a previous iteration cycle and stored in the carry register 172 and the sum register 173. The final result $S_N[n:0]$ may be obtained by adding carry and sum that are respectively stored in the registers 172 and 173 according to variation of the switching value SW.

Because the size of the multiplexer groups 400 may be smaller than the size of the CPA adder 174 and the register 175, exemplary embodiments of the present invention, such as the one illustrated in FIG. 10 may reduce hardware size.

Figure 14:
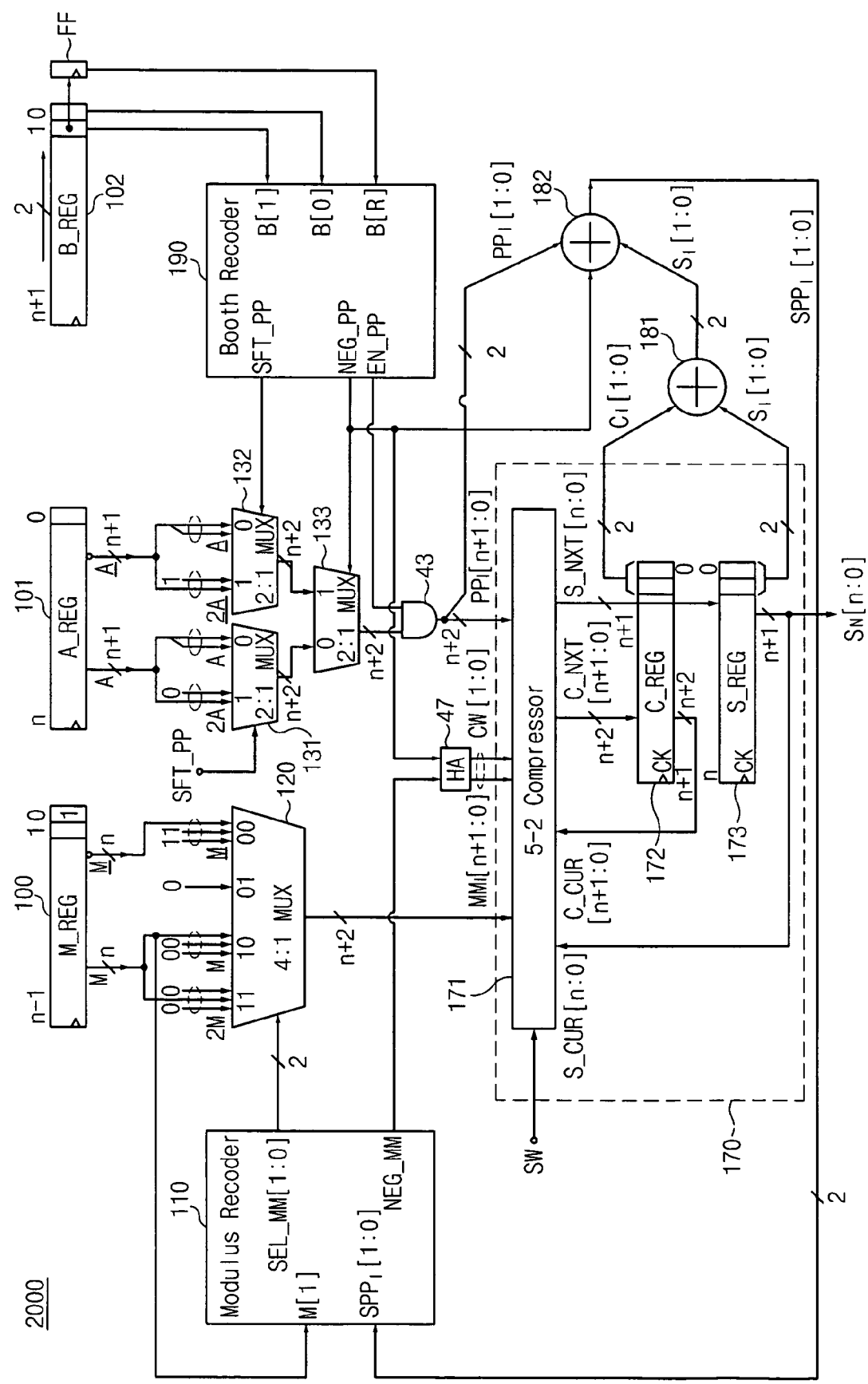
FIG. 14 illustrates a multiplier according to another exemplary embodiment of the present invention.

FIG. 14 illustrates a multiplier 2000 according to another exemplary embodiment of the present invention. The multiplier 2000 includes three multiplexers 131, 132, and 133, instead of one multiplexer 130 of the multiplier 1000 illustrated in FIG. 2. If the multiplexer is separated, the booth recoder 140 of FIG. 2 may be replaced with a booth recoder 190 for generating signals SFT_PP and NEG_PP to be provided to the multiplexers 131, 132, and 133.

Figure 16:
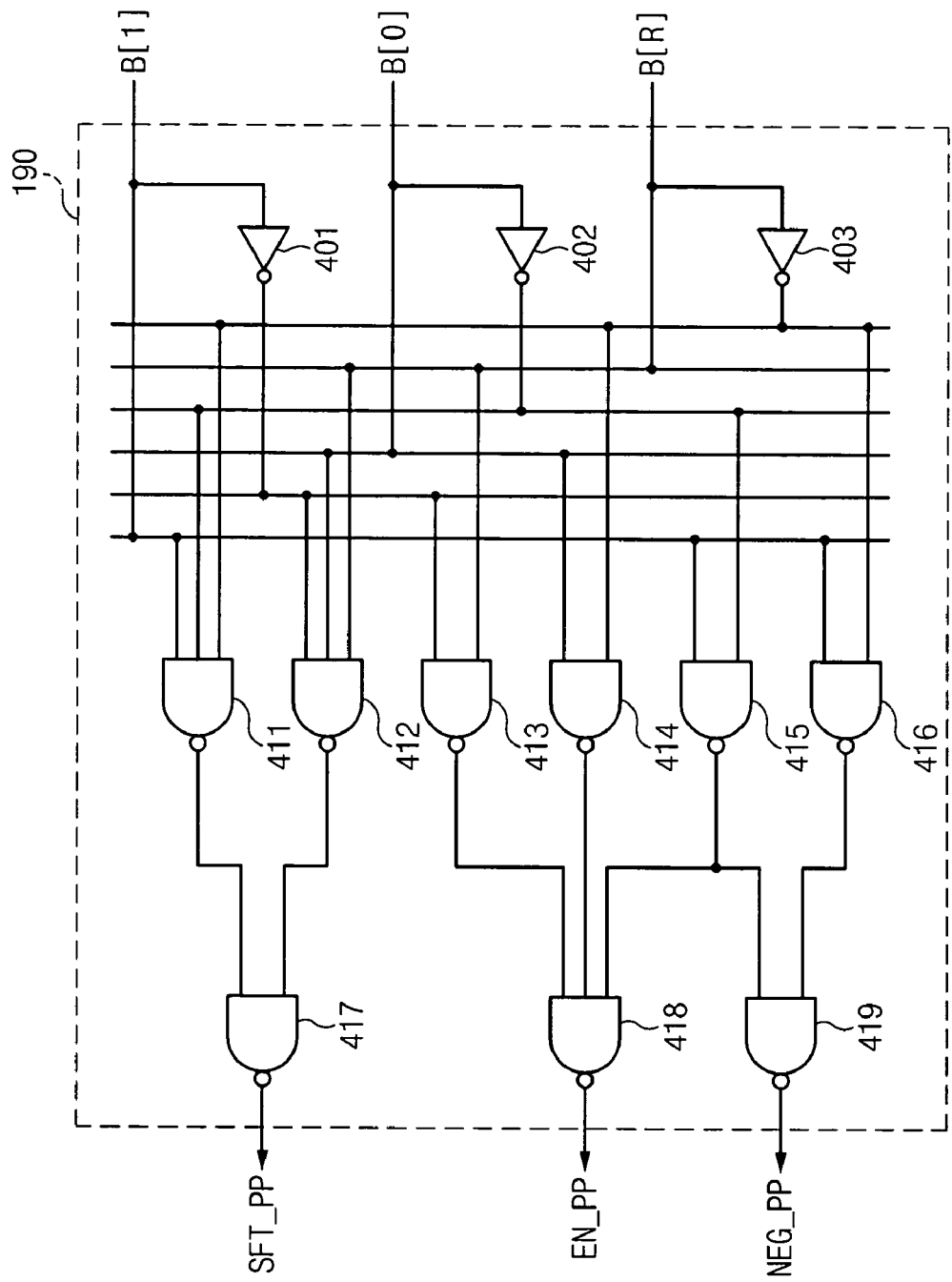
FIG. 16 illustrates an embodiment of a circuit in which a booth recoder is constructed according to the exemplary coding scheme of FIG. 15.

FIG. 15 illustrates an exemplary coding scheme of the booth recoder 190 illustrated in FIG. 14, and FIG. 16 illustrates an exemplary implementation of a booth recoder 190 for carrying out the coding scheme of FIG. 15. Although the exemplary implementation of the booth recoder 190 includes inverters 401-403 and NAND gates 411-417, many other implementations of the booth recoder 190 could be realized by one of ordinary skill in the art.

Figure 17:
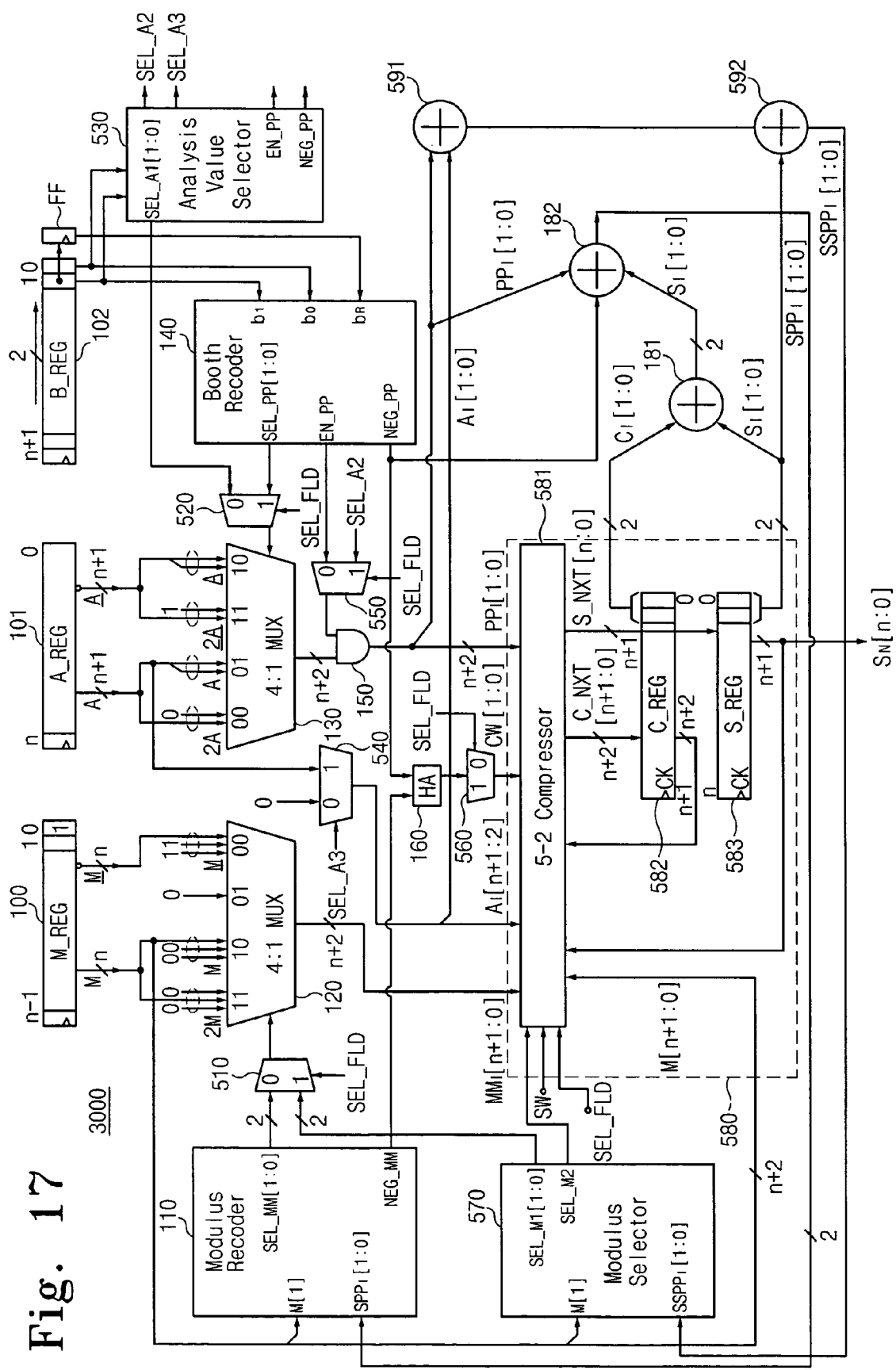
FIG. 17 illustrates a multiplier according to an exemplary embodiment of the present invention, which can selectively perform an integer modular multiplication and a polynomial modular multiplication.

FIG. 17 illustrates a multiplier 3000 according to another exemplary embodiment of the present invention, which can selectively perform an integer modular multiplication and a polynomial modular multiplication. The multiplier 3000 of FIG. 17 can selectively perform an integer modular multiplication and a polynomial modular multiplication according to a selection signal SEL_FLD. In an exemplary embodiment, the multiplier 3000 performs the integer modular multiplication when the selection signal SEL_FLD is zero ("0") and performs the polynomial modular multiplication when the selection signal SEL_FLD is one ("1"). Because the integer modular multiplication portion of the multiplier 3000 is similar to that of the multiplier 1000 illustrated in FIG. 2 (or the multiplier 2000 illustrated in FIG. 14), only the polynomial modular multiplication will now be described hereinafter. In FIG. 17 and FIG. 2, like numerals denote the like elements.

When the polynomial multiplication is performed with the Montgomery modular multiplication algorithm, the multiplication result may be represented by $S(x)_{I+1}:=S(x)_I+b_IA(x)+q_IM(x)$. Similar to the above-described integer multiplication, $q_I$ may be set such that the two LSBs of $S(x)_I+b_IA(x)+q_IM(x)$ become "00". Further, $b_I \in \{0; 1, 2, 3\}$ and $b_IA \in \{0, A, 2A, 3A\}$; because 2A+A is performed to obtain 3A, $b_IA \in \{0, A, 2A, 3A\}$.

A multiplicator (B) stored in a register 102 may be shifted by two bits in each cycle. The two LSBs b1 and b0 of the multiplicator B may be provided to an analysis value selector 530. The analysis value selector 530 may receive the two LSBs b1 and b0 and may output signals SEL_A1[1:0], SEL_A2, and SEL_A3 such that $PP_I[n+1:0]$ becomes 0, A or 2A and AI[2+1:0] becomes 0 or A. A coding scheme for obtaining $b_IA$ of the analysis value selector 530 according to an exemplary embodiment of the present invention is illustrated in FIG. 18.

To select $PP_I[n+1:0]$, the analysis value selector 530 may output a selection signal SEL_A1[1:0] for selecting one of the three values 0, A, and 2A to a multiplexer 520. The multiplexer 520 may output the selection signal SEL_Ai[1:0] to a multiplexer 130 in the polynomial modular multiplication mode (i.e., when SEL_FLD is "1"). The multiplexer 130 may receive the values of a multiplicand (A) and the selection signal SEL_A[1:0] and provide an output to an AND gate 150.

A multiplexer 550 may output a selection signal SEL_A2 from the analysis value selector 530 to the AND gate 150. The AND gate 150 may receive an input from the multiplexer 130 and the selection signal SEL_A2 from the multiplexer 550 and output a first analysis value $PP_I[n+1:0]$ to an accumulator 580.

To select $A_I[n+1:0]$, the analysis value selector 530 may output a selection signal SEL_A3 to a multiplexer 540 so as to select either one of 0 and A. The multiplexer 540 receives 0, the value of the multiplicator A, and the selection signal SEL_A3 and outputs a second analysis value $A_I[n+1:0]$. The two LSBs $A_I[1:0]$ of the multiplexer 540 may be input to the multiplexer 560 and an adder 591, and the other bit $A_I[n+1:2]$ may be input to the accumulator 580.

In the polynomial modular multiplication mode, the multiplexer 560 outputs the two LSBs $A_I[1:0]$ from the multiplexer 540 as CW[1:0]. The output CW[1:0] of the multiplexer 560 may be input to the accumulator 580.

The adder 591 may sum the two LSBs $PP_I[1:0]$ of a first analysis value $PP_I[n+1:0]$ and the two LSBs $A_I[1:0]$ of a second analysis value $A_I[n+1:0]$ and may output the sum result to an adder 592, where $PP1[1:0]+A_I[1:0]=b_IA(x)[1:0]$.

The adder 592 may sum the output of the adder 591 and the two LSBs $S_I[1:0]$ of a value stored in the sum register 583 and may output the sum result to the modulus selector 570.

The modulus selector 570 may select the modulus MM1[n+1:0] such that the two LSBs of $(S(x)_I+b_IA(x)+q_IM(x))$ become "00". In the Montgomery algorithm, the LSB $MM_I[0]$ of the modulus is always one ("1"). Thus, $q_I$ may be determined from $(S(x)_I+b_IA(x))$ and M[1].

A coding scheme of the modulus selector 570 is illustrated in FIG. 19.

To select $MM_I[n+1:0]$, the modulus selector 570 may output a selection signal SEL_M1[1:0], for selecting one of the three values 0, M, and 2M, to the multiplexer 510. The multiplexer 510 may output the selection signal SEL_M1[1:0] to the multiplexer 120 in a polynomial modular multiplication mode (i.e., when SEL_FLD is "1"). The multiplexer 120 may receive values-of the modulus M, and the selection signal SEL_M1[1:0] and provide an output $MM_I[n+1:0]$ to the accumulator 580.

Figure 20:
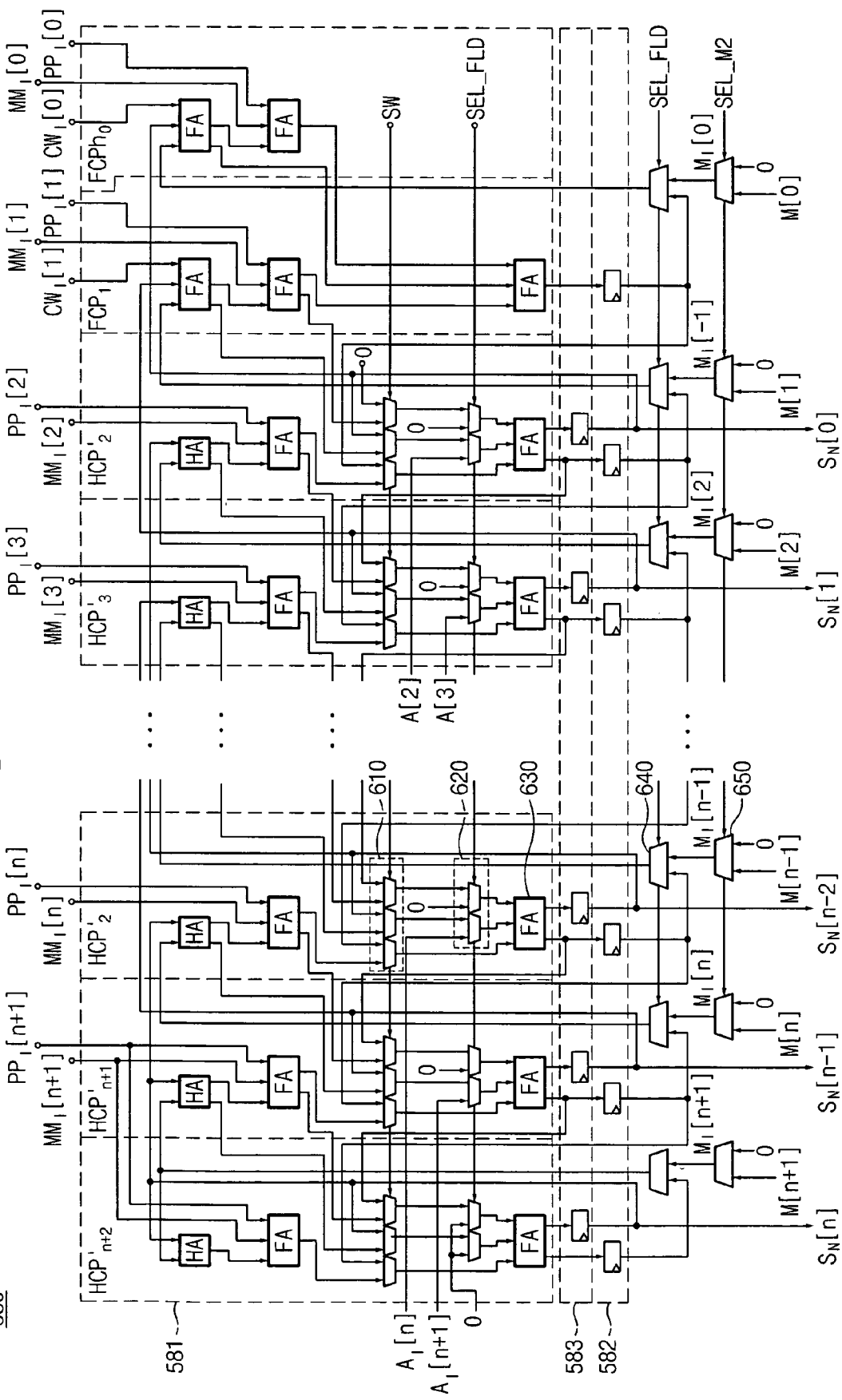
FIG. 20 illustrates a more detailed circuit configuration of an accumulator illustrated in FIG. 17 according to an exemplary embodiment of the present invention.

A more detailed circuit configuration of the accumulator 580 is illustrated in FIG. 20. Similar to the accumulator 170b illustrated in FIG. 13, the accumulator 580 includes n+2 series of 5-2 compressors that may be classified into full compressors and reduced compressors, where n is a bit length of the modulus M. The accumulator 580 may include the elements of the accumulator 170b illustrated in FIG. 13 as well as a multiplexer group 620 and multiplexers 640 and 650. The multiplexer group 620 is disposed between the multiplexer group 610 and the full adder 630.

In an integer modular multiplication mode (SEL_FLD="0"), an output from the multiplexer group 610 may be input to the full adder 630 through the multiplexer group 620, and a carry output from the full adder 630 may be transferred to a carry input of a lower bit compressor. The integer modular multiplication mode of the accumulator 580 may have the same operation as the accumulator 170b illustrated in FIG. 13.

Figure 21:
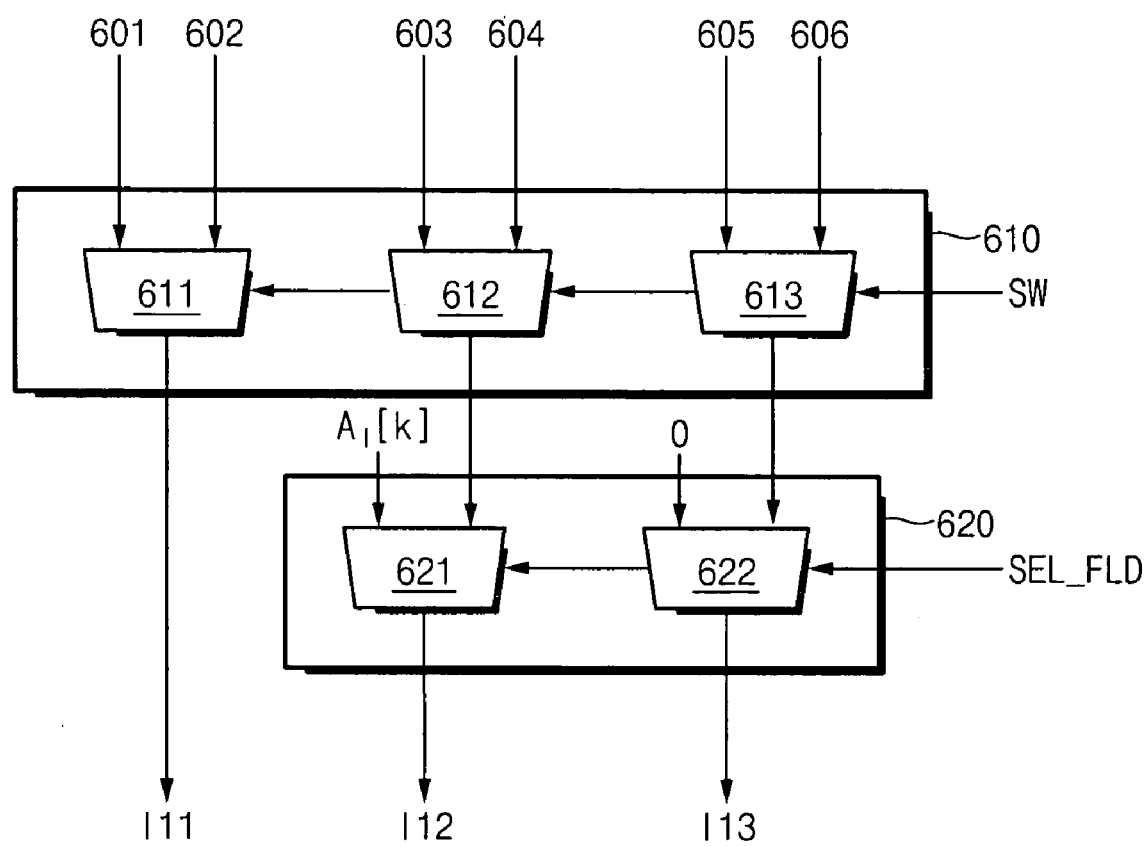
FIG. 21 illustrates kth bit multiplexer groups according to an exemplary embodiment of the present invention.

FIG. 21 illustrates kth bit multiplexer groups 610 and 620 according to an exemplary embodiment of the present invention. Similar to the multiplexer group 400 illustrated in FIG. 12, the multiplexer group 610 may include first to third multiplexer 611, 612, and 613 and receive first to sixth inputs 601-606. The multiplexer groups 400 and 610 may receive the same signals and operate similarly, accordingly the multiplexer group 610 will not be described in further detail.

The multiplexer group 620 may be provided to sum the second analysis value $A_f[n+1:2]$ from the multiplexer 540 and the first analysis value $PP_f[n+1:2]$ during the polynomial modular multiplication mode. The two LSBs of the second analysis value $A_f[n+1:2]$ may be output as CW[1:0] through the multiplexer 560 to be input to an accumulator 581. Thus, the CW[1:0] is added to the two LSBs $PP_f[1:0]$ of the first analysis value by the accumulator 580. The multiplexer group 620 may include fourth and fifth multiplexers 621 and 622. The fourth multiplexer 621 may receive the output from the second multiplexer 612 and the second analysis value $A_f[k]$ from the multiplexer 540. The fifth multiplexer 622 may receive the output from the third multiplexer 613 and "0". The fourth and fifth multiplexers 621 and 622 may output the inputs from the second and third multiplexers in the integer modular multiplication mode (SEL_FLD="0") respectively and output the $A_f[k]$ and 0. Outputs I12 and I13 of the multiplexers may be provided to a full adder 630.

Returning to FIG. 20, the kth multiplexers 640 and 650 may selectively provide the second analysis value $M_f[k]$ to the carry input of the kth compressor during the polynomial modular multiplication mode (SEL_FLD="1"). This may be performed to sum the first analysis value $MM_f[n+1:0]$ and the second analysis value $M_f[n+1:0]$ to obtain $q_iM(x)$.

The multiplexer 650 may output the modulus M[k] or "0" as the second analysis value $M_f[k]$ to the multiplexer 640 in response to the selection signal SEL_M2 from the modulus selector 570. The multiplexer 640 may provide the kth carry bit of the carry register 582 to the carry bit of the lower bit compressor in the integer modular multiplication mode (SEL_FLD="0") and may provide the second analysis value $M_f[k]$ from the multiplexer 650 thereto in the polynomial modular multiplication mode (SEL_FLD="1").

An exemplary multiplier 3000 is illustrated in FIG. 17. The multiplier 3000 may include the elements of the multiplier 1000 illustrated in FIG. 2 as well as several additional elements, in order to perform both the integer modulus multiplication and the polynomial modular multiplication.

The description of the invention is merely exemplary in nature and, thus, variations that do not depart from the gist of the invention are intended to be within the scope of the exemplary embodiments of the present invention. Such variations are not to be regarded as a departure from the spirit and scope of the present invention. For example multiplexers disclosed herein may have a variety of ratio values. Likewise the multiplexers and other elements described in exemplary embodiments of the present invention can be composed of a single multiplexer (element) or individual multiplexers (elements) with varying inputs. Likewise controlling signal can be switched so that a value of zero and one signifies reverse results. Further variations of the exemplary embodiments of the present invention described herein will become apparent to one of ordinary skill in the art, such variations are intended to lie within the scope of the present invention.

Further, although several exemplary multipliers 1000, 2000, 3000 have been described with exemplary elements and/or features and/or variations, each of the exemplary elements and/or features and/or variations described herein may be used alone, in any combination, or in any multiplier, as would be known to one of ordinary skill in the art.

The description of exemplary embodiments of the invention are merely exemplary in nature and, thus, variations that do not depart from the gist of the invention are intended to be within the scope of the exemplary embodiments of the present invention. Such variations are not to be regarded as a departure from the-spirit and scope of the present invention.

What is claimed is:

1. A multiple modulus selector of a computer system, communication network, or computer system and communication network that uses a public-key cryptographic algorithm, the multiple modulus selector comprising:
   a modulus recoder adapted to receive an n-bit modulus M, a previous sum, and a current partial product to generate a first selection signal;
   a modulus selector adapted to receive the n-bit modulus M, the previous sum, the current partial product, and a multiplicand to generate a second selection signal; and
   a multiplexer adapted to receive inputs −M, 0, M, and 2M, adapted to select one of the inputs −M, 0, M, and 2M based on the first selection signal in an integer modular multiplication mode, and adapted to select one of the inputs −M, 0, M, and 2M based on the second selection signal in a polynomial modular multiplication mode;
   wherein the multiple modulus selector is used in the public-key cryptographic algorithm.

2. The multiple modulus selector of claim 1, wherein the input −M is obtained by inverting the modulus M.

3. The multiple modulus selector of claim 1, wherein the input 2M is obtained by shifting the modulus M.

4. The multiple modulus selector of claim 1, wherein the modulus M is stored in a register.

5. The multiple modulus selector of claim 1, wherein the modulus recoder further generates a multiple modulus negation indicating signal that is input to an accumulator.

6. The multiple modulus selector of claim 1, wherein the n-bit modulus M includes a second least significant bit and a sum of the previous sum and current partial product.

7. The multiple modulus selector of claim 1, wherein the first selection signal includes two bits.

8. The multiple modulus selector of claim 1, wherein the modulus selector further generates a multiple modulus accumulation indicating signal that is input to an accumulator.

9. The multiple modulus selector of claim 1, wherein the multiplicand includes two bits.

10. The multiple modulus selector of claim 1, wherein the second selection signal includes two bits.

11. A Montgomery modular multiplier of a computer system, communication network, or computer system and communication network that uses a public-key cryptographic algorithm, the Montgomery modular multiplier comprising:
    a multiple modulus selector adapted to select one of −M, 0, M, and 2M (M being an n-bit modulus number) as a multiple modulus in an integer modular multiplication mode, and adapted to select one of 0, M, and 2M as a multiple modulus in a polynomial modular multiplication mode to output a multiple modulus accumulation indicating signal;
    a Booth recoder adapted to provide a first value used to obtain a partial product value; and
    an accumulator adapted to sum second values to obtain a result of the Montgomery multiplier;
    wherein the accumulator sums the modulus M and the second values based on the multiple modulus accumulation indicating signal in the polynomial modular multiplication mode;
    wherein the Montgomery modular multiplier is used in the public-key cryptographic algorithm.

12. The Montgomery multiplier of claim 11, further comprising:
    a modulus number register adapted to store a modulus value in the modulus number register;
    a multiplicand register adapted to store a multiplicand value in the multiplicand register;

a multiplicator register adapted to store a multiplicator value in the multiplicator register;

an AND gate adapted to combine the multiplicator value with the multiplicand value; and two adders adapted to combine the values from the accumulator and the AND gate to output a combined value;

wherein the combined value is input to the multiple modulus selector.

13. The Montgomery multiplier of claim 11, wherein the multiple modulus selector comprises:

a modulus recoder adapted to receive an n-bit modulus M, a previous sum, and a current partial product to generate a first selection signal;

a modulus selector adapted to receive the n-bit modulus M, the previous sum, the current partial product, and a multiplicand to generate a second selection signal; and a multiplexer adapted to receive inputs −M, 0, M, and 2M, adapted to select one of the inputs −M, 0, M, and 2M based on the first selection signal in an integer modular multiplication mode, and adapted to select one of the inputs 0, M, and 2M based on the second selection signal in a polynomial modular multiplication mode.

14. The Montgomery multiplier of claim 11, wherein the Booth recoder comprises:

a first selector adapted to receive a multiplicator to generate a third selection signal;

a second selector adapted to receive the multiplicator to generate a fourth selection signal; and a multiplexer adapted to receive inputs −2A, −A, 0, A, 2A, adapted to select one of the inputs −2A, −A, 0, A, 2A based on the third selection signal in an integer modular multiplication mode, and adapted to select one of the inputs 0, A, and 2A based on the fourth selection signal in a polynomial modular multiplication mode.

15. A Booth recoder of a computer system, communication network, or computer system and communication network that uses a public-key cryptographic algorithm, the Booth recoder comprising:

a first selector adapted to receive a multiplicator to generate a first selection signal;

a second selector adapted to receive the multiplicator to generate a second selection signal; and a multiplexer adapted to receive first inputs −2A, −A, 0, A, 2A, adapted to select one of the first inputs −2A, −A, 0, A, 2A based on the first selection signal in an integer modular multiplication mode, adapted to receive second inputs 0, A, and 2A, and adapted to select one of the second inputs 0, A, and 2A based on the second selection signal in a polynomial modular multiplication mode;

wherein the Booth recoder is used in the public-key cryptographic algorithm.

* * * * *